(12) United States Patent
Yonge, III et al.

(10) Patent No.: US 8,660,013 B2
(45) Date of Patent: Feb. 25, 2014

(54) DETECTING DELIMITERS FOR LOW-OVERHEAD COMMUNICATION IN A NETWORK

(75) Inventors: Lawrence W. Yonge, III, Ocala, FL (US); Srinivas Katar, Gainesville, FL (US)

(73) Assignee: QUALCOMM Incorporated, San Diego, CA (US)

(*) Notice: Subject to any disclaimer, the term of this patent is extended or adjusted under 35 U.S.C. 154(b) by 140 days.

(21) Appl. No.: 13/085,242

(22) Filed: Apr. 12, 2011

(65) Prior Publication Data

US 2011/0267956 A1 Nov. 3, 2011

Related U.S. Application Data

(60) Provisional application No. 61/323,326, filed on Apr. 12, 2010, provisional application No. 61/323,434, filed on Apr. 13, 2010.

(51) Int. Cl.
*H04J 3/14* (2006.01)

(52) U.S. Cl.
USPC .......................................................... 370/241

(58) Field of Classification Search
USPC .......................................................... 370/241
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |

(Continued)

FOREIGN PATENT DOCUMENTS

| | | |
|---|---|---|
| CN | 102939730 | 2/2013 |
| CN | 102939736 | 2/2013 |

(Continued)

OTHER PUBLICATIONS

Ka Ki Yeung, 2003, University of California, Detailed OFDM Modeling in Network Simulation of Mobile Ad Hoc Networks, entire document.*

(Continued)

*Primary Examiner* — Mark Rinehart
*Assistant Examiner* — Maharishi Khirodhar
(74) *Attorney, Agent, or Firm* — DeLizio Gilliam, PLLC

(57) ABSTRACT

A waveform communicated from a first station to a second station over the shared medium may be communicated at a time that is based on a shared time reference shared by the first and second stations. The waveform may include at least a first symbol, having a predetermined symbol length, comprising a first set of frequency components at predetermined carrier frequencies modulated with preamble information and a second set of frequency components at predetermined carrier frequencies modulated with frame control information. The carrier frequencies of the first and second sets of frequency components may be integral multiples of a frequency interval determined by the inverse of the symbol length. The first symbol of the waveform may be demodulated in response to detecting a series of values sampled based on the shared time reference.

42 Claims, 27 Drawing Sheets

(56) References Cited

U.S. PATENT DOCUMENTS

| | | | |
|---|---|---|---|
| 4,819,229 A | 4/1989 | Pritty et al. | |
| 4,872,185 A * | 10/1989 | Braun et al. | 375/355 |
| 4,881,241 A | 11/1989 | Pommier et al. | |
| 4,943,959 A | 7/1990 | Arnold | |
| 5,001,472 A | 3/1991 | Fischer et al. | |
| 5,003,539 A | 3/1991 | Takemoto et al. | |
| 5,046,069 A | 9/1991 | Calvignac et al. | |
| 5,081,678 A | 1/1992 | Kaufman et al. | |
| 5,105,423 A | 4/1992 | Tanaka et al. | |
| 5,121,396 A | 6/1992 | Irvin et al. | |
| 5,140,584 A | 8/1992 | Suzuki | |
| 5,157,659 A | 10/1992 | Schenkel | |
| 5,197,061 A | 3/1993 | Halbert-Lassalle et al. | |
| 5,214,646 A | 5/1993 | Yacoby | |
| 5,228,025 A | 7/1993 | Le Floch et al. | |
| 5,231,634 A | 7/1993 | Giles et al. | |
| 5,274,629 A | 12/1993 | Helard et al. | |
| 5,280,480 A | 1/1994 | Pitt et al. | |
| 5,282,222 A | 1/1994 | Fattouche et al. | |
| 5,307,376 A | 4/1994 | Castelain et al. | |
| 5,339,313 A | 8/1994 | Ben-Michael et al. | |
| 5,343,473 A | 8/1994 | Cidon et al. | |
| 5,384,777 A | 1/1995 | Ahmadi et al. | |
| 5,416,801 A | 5/1995 | Chouly et al. | |
| 5,426,646 A | 6/1995 | Slack | |
| RE35,001 E | 7/1995 | Grow | |
| 5,432,848 A | 7/1995 | Butter et al. | |
| 5,436,905 A | 7/1995 | Li et al. | |
| 5,448,561 A | 9/1995 | Kaiser et al. | |
| 5,448,565 A | 9/1995 | Chang et al. | |
| 5,452,288 A | 9/1995 | Rahuel et al. | |
| 5,452,322 A | 9/1995 | Lauer | |
| 5,473,602 A | 12/1995 | McKenna et al. | |
| 5,481,535 A | 1/1996 | Hershey | |
| 5,483,529 A | 1/1996 | Baggen et al. | |
| 5,488,632 A | 1/1996 | Mason et al. | |
| 5,504,747 A | 4/1996 | Sweazey | |
| 5,515,379 A | 5/1996 | Crisler et al. | |
| 5,524,027 A | 6/1996 | Huisken | |
| 5,537,414 A | 7/1996 | Takiyasu et al. | |
| 5,541,922 A | 7/1996 | Pyhalammi | |
| 5,548,649 A | 8/1996 | Jacobson | |
| 5,555,268 A | 9/1996 | Fattouche et al. | |
| 5,563,883 A | 10/1996 | Cheng | |
| 5,563,897 A | 10/1996 | Pyndiah et al. | |
| 5,568,476 A | 10/1996 | Sherer et al. | |
| 5,610,908 A | 3/1997 | Shelswell et al. | |
| 5,612,975 A | 3/1997 | Becker et al. | |
| 5,615,212 A | 3/1997 | Ruszczyk et al. | |
| 5,619,651 A | 4/1997 | Young | |
| 5,623,512 A | 4/1997 | Sasaki | |
| 5,629,942 A | 5/1997 | Zijderhand | |
| 5,629,948 A | 5/1997 | Hagiwara et al. | |
| 5,636,230 A | 6/1997 | Marturano et al. | |
| 5,644,576 A | 7/1997 | Bauchot et al. | |
| 5,651,009 A | 7/1997 | Perreault et al. | |
| 5,694,389 A | 12/1997 | Seki et al. | |
| 5,706,348 A | 1/1998 | Gray et al. | |
| 5,717,689 A | 2/1998 | Ayanoglu | |
| 5,732,113 A | 3/1998 | Schmidl et al. | |
| 5,737,330 A | 4/1998 | Fulthorp et al. | |
| 5,745,769 A | 4/1998 | Choi | |
| 5,757,766 A | 5/1998 | Sugita | |
| 5,757,770 A | 5/1998 | Lagoutte et al. | |
| 5,764,931 A | 6/1998 | Schmahl et al. | |
| 5,771,235 A | 6/1998 | Tang et al. | |
| 5,787,071 A | 7/1998 | Basso et al. | |
| 5,790,541 A | 8/1998 | Patrick et al. | |
| 5,793,307 A | 8/1998 | Perreault et al. | |
| 5,793,861 A | 8/1998 | Haigh | |
| 5,799,033 A | 8/1998 | Baggen | |
| 5,812,599 A | 9/1998 | Van Kerckhove | |
| 5,818,821 A | 10/1998 | Schurig | |
| 5,818,826 A | 10/1998 | Gfeller et al. | |
| 5,825,807 A | 10/1998 | Kumar | |
| 5,828,677 A | 10/1998 | Sayeed et al. | |
| 5,841,778 A | 11/1998 | Shaffer et al. | |
| 5,841,873 A | 11/1998 | Lockhart et al. | |
| 5,852,630 A | 12/1998 | Langberg et al. | |
| 5,884,040 A | 3/1999 | Chung | |
| 5,886,993 A | 3/1999 | Ruszczyk et al. | |
| 5,892,769 A | 4/1999 | Lee | |
| 5,896,561 A | 4/1999 | Schrader et al. | |
| 5,903,614 A | 5/1999 | Suzuki et al. | |
| 5,914,932 A | 6/1999 | Suzuki et al. | |
| 5,914,959 A | 6/1999 | Marchetto et al. | |
| 5,940,399 A | 8/1999 | Weizman | |
| 5,940,438 A | 8/1999 | Poon et al. | |
| 5,948,060 A | 9/1999 | Gregg et al. | |
| 5,956,338 A | 9/1999 | Ghaibeh | |
| 5,966,412 A | 10/1999 | Ramaswamy | |
| 5,970,062 A | 10/1999 | Bauchot | |
| 5,987,011 A | 11/1999 | Toh | |
| 5,991,308 A | 11/1999 | Fuhrmann et al. | |
| 6,005,894 A | 12/1999 | Kumar | |
| 6,006,017 A | 12/1999 | Joshi et al. | |
| 6,041,063 A | 3/2000 | Povlsen et al. | |
| 6,041,358 A | 3/2000 | Huang et al. | |
| 6,044,154 A | 3/2000 | Kelly | |
| 6,044,482 A | 3/2000 | Wong | |
| 6,052,377 A | 4/2000 | Ohmi et al. | |
| 6,074,086 A | 6/2000 | Yonge, III | |
| 6,076,115 A | 6/2000 | Sambamurthy et al. | |
| 6,092,214 A | 7/2000 | Quoc et al. | |
| 6,097,703 A | 8/2000 | Larsen et al. | |
| 6,098,179 A | 8/2000 | Harter, Jr. | |
| 6,108,713 A | 8/2000 | Sambamurthy et al. | |
| 6,111,919 A | 8/2000 | Yonge, III | |
| 6,125,150 A | 9/2000 | Wesel et al. | |
| 6,130,887 A | 10/2000 | Dutta | |
| 6,130,894 A | 10/2000 | Ojard et al. | |
| 6,151,296 A | 11/2000 | Vijayan et al. | |
| 6,169,744 B1 | 1/2001 | Grabelsky et al. | |
| 6,182,147 B1 | 1/2001 | Farinacci | |
| 6,188,717 B1 | 2/2001 | Kaiser et al. | |
| 6,192,397 B1 | 2/2001 | Thompson | |
| 6,202,082 B1 | 3/2001 | Tomizawa et al. | |
| 6,215,792 B1 | 4/2001 | Abi-Nassif | |
| 6,216,244 B1 | 4/2001 | Myers et al. | |
| 6,222,851 B1 | 4/2001 | Petry | |
| 6,243,386 B1 | 6/2001 | Chan et al. | |
| 6,243,449 B1 | 6/2001 | Margulis et al. | |
| 6,246,770 B1 | 6/2001 | Stratton et al. | |
| 6,252,849 B1 | 6/2001 | Rom et al. | |
| 6,259,696 B1 | 7/2001 | Yazaki et al. | |
| 6,263,445 B1 | 7/2001 | Blumenau | |
| 6,269,132 B1 | 7/2001 | Yonge, III | |
| 6,278,685 B1 | 8/2001 | Yonge, III et al. | |
| 6,278,716 B1 | 8/2001 | Rubenstein et al. | |
| 6,279,716 B1 | 8/2001 | Kayatani et al. | |
| 6,289,000 B1 | 9/2001 | Yonge, III | |
| 6,295,296 B1 | 9/2001 | Tappan | |
| 6,334,185 B1 | 12/2001 | Hansson et al. | |
| 6,343,083 B1 | 1/2002 | Mendelson et al. | |
| 6,363,052 B1 | 3/2002 | Hosein | |
| 6,370,156 B2 | 4/2002 | Spruyt et al. | |
| 6,385,672 B1 | 5/2002 | Wang et al. | |
| 6,397,368 B1 | 5/2002 | Yonge, III et al. | |
| 6,421,725 B1 | 7/2002 | Vermilyea et al. | |
| 6,430,192 B1 | 8/2002 | Creedon et al. | |
| 6,430,661 B1 | 8/2002 | Larson et al. | |
| 6,434,153 B1 | 8/2002 | Yazaki et al. | |
| 6,442,129 B1 | 8/2002 | Yonge, III et al. | |
| 6,456,649 B1 | 9/2002 | Isaksson et al. | |
| 6,466,580 B1 | 10/2002 | Leung | |
| 6,469,992 B1 | 10/2002 | Schieder | |
| 6,473,435 B1 | 10/2002 | Zhou et al. | |
| 6,480,489 B1 | 11/2002 | Muller et al. | |
| 6,487,212 B1 | 11/2002 | Erimli et al. | |
| 6,501,760 B1 | 12/2002 | Ohba et al. | |
| 6,519,263 B1 | 2/2003 | Huth | |
| 6,526,451 B2 | 2/2003 | Kasper | |
| 6,538,985 B1 | 3/2003 | Petry et al. | |
| 6,553,225 B1 | 4/2003 | Zhao et al. | |

(56) References Cited

U.S. PATENT DOCUMENTS

| | | |
|---|---|---|
| 6,553,534 B2 | 4/2003 | Yonge, III et al. |
| 6,567,416 B1 | 5/2003 | Chuah |
| 6,567,914 B1 | 5/2003 | Just et al. |
| 6,622,172 B1 | 9/2003 | Tam |
| 6,654,410 B2 | 11/2003 | Tzannes |
| 6,667,991 B1 | 12/2003 | Tzannes |
| 6,671,284 B1 | 12/2003 | Yonge, III et al. |
| 6,704,302 B2 | 3/2004 | Einbinder et al. |
| 6,747,976 B1 | 6/2004 | Bensaou et al. |
| 6,778,507 B1 | 8/2004 | Jalali |
| 6,907,044 B1 | 6/2005 | Yonge et al. |
| 6,909,723 B1 | 6/2005 | Yonge et al. |
| 7,061,856 B2 | 6/2006 | Banerjee |
| 7,099,270 B2 | 8/2006 | Yamaguchi |
| 7,280,464 B1 | 10/2007 | Newhouse et al. |
| 7,280,517 B2 | 10/2007 | Benveniste |
| RE40,034 E | 1/2008 | Westby et al. |
| 7,352,770 B1 | 4/2008 | Yonge et al. |
| 7,369,579 B2 | 5/2008 | Logvinov et al. |
| 7,394,864 B2 | 7/2008 | Webster et al. |
| 7,397,758 B1 | 7/2008 | Hart et al. |
| 7,457,306 B2 | 11/2008 | Watanabe et al. |
| 7,499,486 B2 | 3/2009 | Boer et al. |
| 7,522,630 B2 | 4/2009 | Ho et al. |
| 7,551,606 B2 | 6/2009 | Iwamura |
| 7,558,294 B2 | 7/2009 | Yonge, III et al. |
| 7,583,725 B1 * | 9/2009 | Dick ............................. 375/219 |
| 7,623,542 B2 | 11/2009 | Yonge et al. |
| 7,701,917 B2 | 4/2010 | Mantravadi et al. |
| 7,715,425 B2 | 5/2010 | Yonge, III et al. |
| 7,729,372 B2 | 6/2010 | Yonge, III et al. |
| 7,746,940 B2 | 6/2010 | Yeon et al. |
| 7,822,059 B2 | 10/2010 | Katar et al. |
| 7,890,049 B2 | 2/2011 | Chang et al. |
| 8,005,051 B2 | 8/2011 | Watanabe |
| 8,126,090 B1 | 2/2012 | Nabar |
| 2001/0043576 A1 | 11/2001 | Terry |
| 2001/0048692 A1 | 12/2001 | Karner |
| 2002/0012320 A1 | 1/2002 | Ogier et al. |
| 2002/0027897 A1 | 3/2002 | Moulsley et al. |
| 2002/0042836 A1 | 4/2002 | Mallory |
| 2002/0048368 A1 | 4/2002 | Gardner |
| 2002/0061031 A1 | 5/2002 | Sugar et al. |
| 2002/0065047 A1 | 5/2002 | Moose |
| 2002/0115458 A1 | 8/2002 | Mizuno et al. |
| 2002/0137462 A1 | 9/2002 | Rankin |
| 2002/0191533 A1 | 12/2002 | Chini et al. |
| 2002/0191564 A1 | 12/2002 | Kuo |
| 2003/0006883 A1 | 1/2003 | Kim et al. |
| 2003/0079169 A1 | 4/2003 | Ho et al. |
| 2003/0174664 A1 | 9/2003 | Benveniste |
| 2003/0179721 A1 | 9/2003 | Shurmantine et al. |
| 2003/0181204 A1 | 9/2003 | Benveniste |
| 2003/0217182 A1 | 11/2003 | Liu et al. |
| 2003/0227934 A1 | 12/2003 | White et al. |
| 2004/0001499 A1 | 1/2004 | Patella et al. |
| 2004/0064509 A1 | 4/2004 | Ayyagari et al. |
| 2004/0077338 A1 | 4/2004 | Hsu et al. |
| 2004/0136396 A1 | 7/2004 | Yonge et al. |
| 2004/0250159 A1 | 12/2004 | Tober et al. |
| 2005/0041588 A1 | 2/2005 | Kim et al. |
| 2005/0114489 A1 | 5/2005 | Yonge, III et al. |
| 2005/0149649 A1 | 7/2005 | Carneal et al. |
| 2005/0185738 A1 | 8/2005 | Gaikwad |
| 2005/0190785 A1 | 9/2005 | Yonge, III et al. |
| 2005/0192011 A1 | 9/2005 | Hong et al. |
| 2005/0265235 A1 | 12/2005 | Accapadi et al. |
| 2006/0013255 A1 | 1/2006 | Kuskin |
| 2006/0034247 A1 | 2/2006 | Gu et al. |
| 2006/0120323 A1 | 6/2006 | Ye et al. |
| 2006/0126513 A1 | 6/2006 | Li et al. |
| 2006/0140293 A1 | 6/2006 | Lai et al. |
| 2006/0209732 A1 | 9/2006 | Gorokhov et al. |
| 2006/0239213 A1 | 10/2006 | Frederiks et al. |
| 2006/0256881 A1 | 11/2006 | Yonge, III et al. |
| 2007/0025252 A1 | 2/2007 | McGee et al. |
| 2007/0025383 A1 | 2/2007 | Katar et al. |
| 2007/0025384 A1 | 2/2007 | Ayyagari et al. |
| 2007/0025391 A1 | 2/2007 | Yonge et al. |
| 2007/0025398 A1 | 2/2007 | Yonge et al. |
| 2007/0053282 A1 | 3/2007 | Tong et al. |
| 2007/0058659 A1 | 3/2007 | Ayyagari et al. |
| 2007/0064788 A1 | 3/2007 | Yonge, III |
| 2007/0091925 A1 | 4/2007 | Miyazaki et al. |
| 2007/0127381 A1 | 6/2007 | Oh et al. |
| 2007/0201349 A1 | 8/2007 | McCoy |
| 2007/0230497 A1 | 10/2007 | Choi et al. |
| 2007/0248089 A1 | 10/2007 | Redi et al. |
| 2007/0263529 A1 | 11/2007 | Ishikura et al. |
| 2008/0019263 A1 | 1/2008 | Stolpman |
| 2008/0032630 A1 | 2/2008 | Kim et al. |
| 2008/0043613 A1 | 2/2008 | Yang et al. |
| 2008/0069125 A1 | 3/2008 | Reed et al. |
| 2008/0089221 A1 | 4/2008 | Bruninghaus et al. |
| 2008/0095254 A1 | 4/2008 | Muharemovic et al. |
| 2008/0098042 A1 | 4/2008 | Tian et al. |
| 2008/0117872 A1 | 5/2008 | Kim et al. |
| 2008/0117891 A1 | 5/2008 | Damnjanovic et al. |
| 2008/0175265 A1 | 7/2008 | Yonge et al. |
| 2008/0181109 A1 | 7/2008 | Igarashi et al. |
| 2008/0212704 A1 | 9/2008 | Seto et al. |
| 2008/0250293 A1 | 10/2008 | Taori et al. |
| 2008/0279126 A1 | 11/2008 | Katar et al. |
| 2008/0317150 A1 | 12/2008 | Alexander et al. |
| 2009/0067325 A1 | 3/2009 | Baratakke et al. |
| 2009/0103666 A1 | 4/2009 | Zhao et al. |
| 2009/0110033 A1 | 4/2009 | Shattil |
| 2009/0116461 A1 | 5/2009 | Yonge et al. |
| 2009/0154487 A1 * | 6/2009 | Ryan et al. .................... 370/445 |
| 2009/0207865 A1 | 8/2009 | Yonge et al. |
| 2009/0262859 A1 | 10/2009 | Trachewsky et al. |
| 2009/0296850 A1 | 12/2009 | Xu et al. |
| 2010/0046648 A1 | 2/2010 | Nerella et al. |
| 2010/0074243 A1 | 3/2010 | Yonge, III et al. |
| 2010/0086013 A1 | 4/2010 | Pare, Jr. et al. |
| 2010/0091742 A1 | 4/2010 | Lee et al. |
| 2010/0091920 A1 | 4/2010 | Alexander et al. |
| 2010/0111099 A1 | 5/2010 | Yonge et al. |
| 2010/0202301 A1 | 8/2010 | Wen et al. |
| 2010/0246477 A1 | 9/2010 | Hasegawa |
| 2010/0311343 A1 | 12/2010 | Keerthi |
| 2011/0080967 A1 | 4/2011 | Larsson et al. |
| 2011/0268161 A1 | 11/2011 | Yonge, III |
| 2011/0268200 A1 | 11/2011 | Yonge, III |
| 2011/0280329 A1 | 11/2011 | Yonge, III |
| 2011/0280332 A1 | 11/2011 | Yonge, III |

FOREIGN PATENT DOCUMENTS

| | | |
|---|---|---|
| CN | 102939737 | 2/2013 |
| CN | 102948119 | 2/2013 |
| DE | 3413144 | 10/1985 |
| EP | 0818905 | 1/1998 |
| EP | 1021012 A1 * | 7/2000 |
| JP | 210926 | 1/1990 |
| JP | 1990010926 | 1/1990 |
| JP | 2000286815 | 10/2000 |
| JP | 2001352311 A | 12/2001 |
| JP | 2004536502 | 12/2002 |
| JP | 2003229829 A | 8/2003 |
| JP | 2003304217 | 10/2003 |
| JP | 2003304219 | 10/2003 |
| JP | 200480140 | 11/2004 |
| JP | 2007515113 | 6/2007 |
| JP | 2007520978 A | 7/2007 |
| JP | 2008545285 A | 12/2008 |
| JP | 2009504017 | 1/2009 |
| JP | 2009089146 | 4/2009 |
| JP | 2009514459 A | 4/2009 |
| JP | 2009530992 A | 8/2009 |
| JP | 2011511596 | 4/2011 |
| KR | 1020020012146 | 8/2007 |
| KR | 1020120137505 A | 12/2012 |
| KR | 1020130008608 A | 1/2013 |

(56) References Cited

FOREIGN PATENT DOCUMENTS

| KR | 1020130018296 | 2/2013 |
|---|---|---|
| KR | 1020130018872 | 2/2013 |
| WO | WO 98/57440 | 12/1998 |
| WO | WO 00/72495 | 11/2000 |
| WO | WO 02/06986 | 1/2002 |
| WO | WO 02/13442 | 2/2002 |
| WO | WO 02/41598 | 5/2002 |
| WO | WO 03/100996 | 12/2003 |
| WO | WO 2004/038980 | 5/2004 |
| WO | WO 2007/014319 | 2/2007 |
| WO | 2009120904 | 10/2009 |
| WO | 2010027064 A1 | 3/2010 |

OTHER PUBLICATIONS

Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Bertsekas et al., Data Networks, Prentice Hall, Englewood Cliffs, NJ, Section 2.4.3 Selective Repeat ARQ (1992).
Blake, S. et al. "An Architecture for Differentiated Services," Network Working Group, IETF RFC 2475, Dec. 1998.
Bruschi, Danilo, Secure Multicast in Wireless Networks of Mobile Hosts: Protocols and Issues, 2002, Mobile Networks and Applications, pp. 503-511.
Bux, "Token-Ring Local-Area Networks and Their Performance," Procs. Of the IEEE, vol. 77, No. 2, Feb. 1989.
Carrier sense multiple access with collision detection (CSMA/CD) access method and physical layer specifications, ISO/IEC 8802-3: 1996 International Standard (ANSI/IEEE Std 802.3).
Dube, P.; Altman, E.; Queueing analysis of early message discard policy; Communications, 2002. ICC 2002. IEEE International Conference, vol. 4, Iss., 2002, pp. 2426-2430.
Ehrsam et al., "A cryptographic key management scheme for implementing the Data Encryption Standard," IBM Syst J, vol. 17, No. 2 (1978).
European Search Report, European Patent Office, European Patent Application No. 06253916.8-1246, Oct. 31, 2006, 8 pages.
European Search Report, European Patent Office, European Patent Application No. 09176939, Oct. 15, 2010, 6 pages.
Goalic et al., "Real-Time Turbo-Decoding of Product Codes on a Digital Signal Processor," IEEE, pp. 624-628 (1997).
HiPerformance Radio Local Area Network (HiperLAN) Type I: Functional Specification, European Standard (Telecommunication Series) No. 300652 V. 1.2.1 Jul. 1998.
HomePlug Powerline Alliance, HomePlug 1.0.1 Specification, Dec. 1, 2001.
HomePlug Power Alliance Inc., "HomePlug AV White Paper," Doc ver. Number HPAVWP-050818, Aug. 2005, pp. 1-11.
IBM, Combined use of collision resolution and collision avoidance MAC protocols, Oct. 1, 1994, IBM Technical Disclosure Bulletin, vol. 37, pp. 299-302 (NN9410299).
Interface Specification for HomePNA™ 2.0—10M8 Technology, Dec. 1, 1999.
Interface Specification for HomePNA™ 2.0—10M8 Technology—Link Layer Protocols, Dec. 1, 1999.
International Search Report from PCT application No. PCT/US06/29377, dated Sep. 25, 2007, 9 pages.
ISO/IEC 8802-3: 2002 International Standard (ANSI/IEEE Std 802.3) Carrier sense multiple access with collision detection (CSMA/CD) access method and physical layer specifications.
ISO/IEC 8802-11: 1999 International Standard (ANSI/IEEE Std 802.11) Wireless LAN Medium Access Control (MAC) and Physical Layer (PHY) specifications.
Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.
Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 powerline communication LANs—protocol description and performance results", International Journal of Communication Systems, 2000 vol. 1-6, pp. 1-25.
Peterson et al., "Error-Correcting Codes," The MIT Press (1972).
PKCS #5 vol. 20: Password-Based Cryptography Standard, RSA Laboratories, Mar. 25, 1999.
Pyndiah, "Near Optimum Decoding of Product Codes," IEEE, pp. 339-343 (1994).
Pyndiah, "Near-Optimum Decoding of Product Codes: Block Turbo Codes," IEEE Transactions on Communications, vol. 46, No. 8, pp. 1003-1010 (Aug. 1998).
Pyndiah, "Performance of Block Turbo Coded 16-QAM and 64-QAM Modulations," IEEE, pp. 1039-1043 (1995).
Schneier, Bruce. Applied Cryptography, Second Edition: protocols, algorithms, and source code in C, 1996.
Shared Wireless Access Protocol (Cordless Access) Specification, SWAP-CA Revision 1.21, Jan. 27, 1999, by the HomeRF™ Technical Committee.
Sun et al., Public-key ID-based Cryptosystem, 1991, IEEE, pp. 142-144.
Supplementary European Search Report issued in application No. EP03776498, mailed Jan. 28, 2010, 3 pages.
Unpublished Application, U.S. Appl. No. 12/645,561, filed Dec. 23, 2009, 37 pages.
Unpublished Application, U.S. Appl. No. 12/645,574, filed Dec. 23, 2009, 33 pages.
Li, Tianji et al., "Investigation of the Block ACK Scheme in Wireless Ad-hoc Networks." Wireless Communications & Mobile Computing—Medium Access Control Protocols for Wireless Ad Hoc Networks, vol. 6, Issue 6, Sep. 2006, pp. 1-13.
Segal, Yossi et al., "OFDM Preamble Sctructure Analysis and Proposal." IEEE 802.16 Broadband Wireless Access Working Group http://ieee802.org/16 Mar. 7, 2011, 6 pages.
International Search Report and Written Opinion for Application No. PCT/US2011/032174 dated Jun. 30, 2011, 8 pages.
Ka Ki Yeung, "Detailed OFDM Modeling in Network Simulation of Mobile Ad Hoc Networks," thesis for the degree Master of Science in Computer Science, University of California Los Angeles, http://pcl.cs.ucla.edu/papers/files/theses/gavinyeung-MS.pdf, 2003, 76 pages. [Retrieved Jun. 24, 2011].
International Search Report and Written Opinion in Application No. PCT/US2011/032164 dated Jul. 1, 2011, 10 pages.
International Search Report and Written Opinion in Application No. PCT/US2011/032146 dated Jul. 5, 2011, 10 pages.
International Search Report and Written Opinion in Application No. PCT/US2011/032161 dated Jul. 5, 2011, 8 pages.
International Search Report and Written Opinion in Application No. PCT/US/2011/32165 dated Jul. 25, 2011, 12 pages.
"PCT Application No. PCT/US11/32165 International Preliminary Report on Patentability", Oct. 26, 2012 , 7 Pages.
"PCT Application No. PCT/US11/32165 International Preliminary Report on Patentability", Jan. 3, 2013 , 9 pages.
"PCT Application No. PCT/US2011/032146 International Preliminary Report on Patentability", Oct. 26, 2012 , 9 pages.
"PCT Application No. PCT/US2011/032164 International Preliminary Report on Patentability", Oct. 26, 2012 , 6 pages.
"U.S. Appl. No. 13/085,277 Office Action", Apr. 1, 2013 , 37 pages.
"U.S. Appl. No. 13/085,344 Office Action", Apr. 1, 2013 , 34 pages.
"U.S. Appl. No. 13/085,352 Office Action", Mar. 18, 2013 , 30 Pages.
"U.S. Appl. No. 13/085,319 Office Action", May 23, 2013 , 28 Pages.
"Digital Video Broadcasting, Frame structure channel coding and modulation for a second generation digital terrestrial television broadcasting system (Dvb-T2)", DVB Document A122 Jun. 2008 , p. 102.
"Digital Video Broadcasting, Implementation guidelines for a second generation digital terrestrial television broadcasting system (DVB-T2),", DVB Document A133 Feb. 2009 , pp. 123-129.
"Japanese Application No. 2013-505063 Office Action", Sep. 24, 2013 , 6 pages.
"Japanese Application No. 2013-505057, Office Action", Sep. 10, 2013, 9 pages.

(56) References Cited

OTHER PUBLICATIONS

"Japanese Application No. 2013-505064, Office Action", Sep. 24, 2013, 12 pages.

"Japanese Application No. 2013-505065 Office Action", Sep. 24, 2013, 9 pages.

"Korean Application No. 10-2012-7029657, Office Action", Oct. 30, 2013, 6 pages.

"U.S. Appl. No. 13/085,277 Final Office Action", Oct. 25, 2013, 38 Pages.

"U.S. Appl. No. 13/085,319 Final Office Action", Oct. 10, 2013, 20 Pages.

* cited by examiner

DETECTING DELIMITERS FOR LOW-OVERHEAD COMMUNICATION IN A NETWORK

CROSS-REFERENCE TO RELATED APPLICATIONS

This application claims priority to U.S. Provisional Application Ser. No. 61/323,326, filed on Apr. 12, 2010 the entire contents of which are incorporated herein by reference, and to U.S. Provisional Application Ser. No. 61/323,434, filed on Apr. 13, 2010 the entire contents of which are incorporated herein by reference.

TECHNICAL FIELD

The present disclosure relates to detecting delimiters for low-overhead communication in a network.

BACKGROUND Some techniques for communicating in a network involve modulating data onto signals transmitted over a shared medium. For example, orthogonal frequency division multiplexing (OFDM), also known as Discrete Multi Tone (DMT), is a spread spectrum signal modulation technique in which the available bandwidth of the medium is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM). Alternatively, other modulation techniques can also be used.

Many wireline and wireless network technologies use a Physical Protocol Data Unit (PPDU) format that includes preamble, header, and payload portions. The preamble typically consists of a predetermined signal (e.g., transmitted on one or more OFDM symbols) used for start of PPDU detection and initial channel estimation to decode the header. The header provides network management information for the recipient to properly decode the payload (e.g. tone map index). Additionally, the header may provide information for proper network operation (e.g. virtual carrier sense). The PPDU is usually followed by a subsequent short PPDU that provides the acknowledgement from a receiver of the PPDU. For noisy wireline and wireless media, the preamble, header, and acknowledgement are typically designed to operate under various channel conditions and thus tend to be relatively long in duration in order to be reliable. However, these items add overhead relative to the portion of the transmissions that carry the payload.

SUMMARY

In one aspect, in general, a method for communicating between stations over a shared medium comprises: transmitting a waveform from a first station over the shared medium at a time that is based on a shared time reference shared by multiple of the stations, the waveform including at least a first symbol, having a predetermined symbol length, comprising a first set of frequency components at predetermined carrier frequencies modulated with preamble information stored in a second station and a second set of frequency components at predetermined carrier frequencies modulated with information to be communicated to at least one station, with the carrier frequencies of the first and second sets of frequency components being integral multiples of a frequency interval determined by the inverse of the symbol length; monitoring the shared medium at a second station, before transmission of the waveform from the first station, to detect a start of the first symbol of the waveform at one of multiple time slot boundaries, the monitoring including, after each of multiple time slot boundaries, periodically sampling a series of values received over the shared medium starting at the beginning of the most recent time slot boundary and processing the sampled values to generate a metric value that indicates whether the start of the first symbol of the waveform has been detected; and in response to detecting the start of the first symbol of the waveform, demodulating the first symbol of the waveform from values sampled based on the shared time reference.

In another aspect, in general, a system for communicating between stations over a shared medium comprises a first station that transmits a waveform over the shared medium at a time that is based on a shared time reference shared by multiple of the stations, the waveform including at least a first symbol, having a predetermined symbol length, comprising a first set of frequency components at predetermined carrier frequencies modulated with preamble information stored in a second station and a second set of frequency components at predetermined carrier frequencies modulated with information to be communicated to at least one station, with the carrier frequencies of the first and second sets of frequency components being integral multiples of a frequency interval determined by the inverse of the symbol length. The system also comprises at least a second station that monitors the shared medium before transmission of the waveform from the first station, to detect a start of the first symbol of the waveform at one of multiple time slot boundaries, the monitoring including, after each of multiple time slot boundaries, periodically sampling a series of values received over the shared medium starting at the beginning of the most recent time slot boundary and processing the sampled values to generate a metric value that indicates whether the start of the first symbol of the waveform has been detected, and in response to detecting the start of the first symbol of the waveform, demodulates the first symbol of the waveform from values sampled based on the shared time reference.

Among the many advantages of the invention (some of which may be achieved only in some of its various aspects and implementations) are the following.

In communication systems that communicate packets of data within respective frames, various factors determine the minimum size for any given frame. Some systems use frames that include a number of symbols of a predetermined symbol length (or one of multiple predetermined symbol lengths), such as systems that use OFDM modulation. The length of the frame depends on the number of symbols that make up the frame. The symbols may have an appended cyclic extension to account for uncertainties in timing due to channel characteristics such as delay spread. Thus, a sequence of N adjacent symbols may be longer than N times the symbol length. In the case of OFDM modulation, more densely spaced carriers correspond to a longer symbol length since the carrier frequencies are integral multiples of a frequency interval determined by the inverse of the symbol length.

The efficiency and overall throughput of transmitting packets within respective frames is determined by the ratio of bandwidth devoted to some form of overhead (e.g., a preamble for start of frame detection and channel estimation, frame control data within frames that include packet data within a payload, frames that do not include packet data such as acknowledgement packets, and inter-frame time delays) to bandwidth devoted to payload that carries packet data. In some cases, a frame starts with one or more preamble symbols for synchronizing to the start of a frame, which also adds to the overhead. A longer symbol length can reduce throughput in cases in which small amounts of data are being sent within frames (e.g., frames that have only frame control data and no payload) since the frame needs to be a multiple of the symbol length even if the data being sent fits within a fraction of a symbol. A longer delimiter symbol length can also reduce throughput in cases in which a large amount of data is being sent and the number of bits per symbol is increased, causing payloads of a given size in bits to fit within fewer symbols.

Starting a frame with a delimiter symbol that performs some functions that would be provided by a dedicated preamble symbol, and also encodes some data (such as frame control data, or even a portion of a short payload) that would otherwise have been sent in a separate symbol, can reduce overhead and thus increase throughput in cases in which short payloads may be communicated frequently. The delimiter symbol can also perform the function of providing an estimate of channel characteristics.

Impulse noise affecting the preamble or frame control adversely affects recovery of the payload. A short delimiter symbol, due to its reduced duration, is typically less vulnerable to impulse noise or noise spikes. Reducing the duration of the preamble and frame control (for example, from 110 microseconds to approximately 50 microseconds in some cases) results in a reduction in failure to decode the payload. In some cases, this is due to the probability of an impulse noise event that results in loss of preamble detection and/or frame control detection being less for a shorter delimiter symbol.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
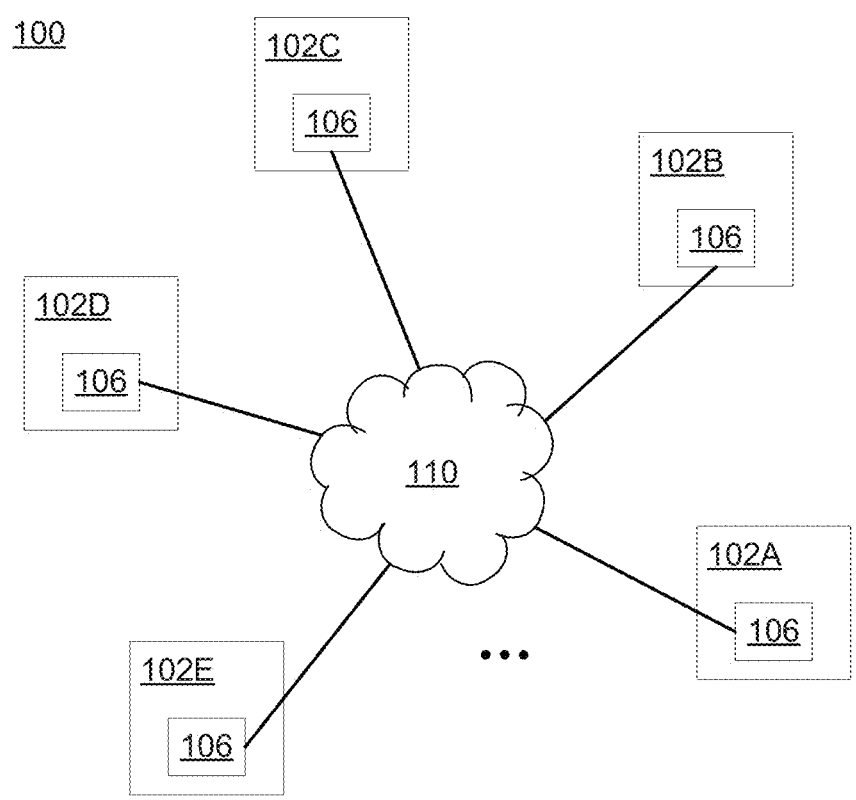
FIG. 1 is a schematic diagram of a network configuration.

As shown in FIG. 1, a network configuration 100 provides a shared communication medium 110 for a number of communication stations 102A-102E (e.g., computing devices, or audiovisual devices) to communicate with each other. The communication medium 110 can include one or more types of physical communication media such as coaxial cable, unshielded twisted pair, power lines, or wireless channels (using electromagnetic waves propagating between transmitting and receiving antennas), for example. The network configuration 100 can also include devices such as bridges or repeaters. The communication stations 102A-102E communicate with each other using predetermined physical (PHY) layer and media access control (MAC) layer communication protocols used by network interface modules 106. The MAC layer is a sub-layer of the data link layer and provides an interface to the PHY layer, according to the Open Systems Interconnection (OSI) network architecture model, for example. The network configuration 100 can have any of a variety of network topologies (e.g., bus, tree, star, mesh).

In some implementations, the stations use a low-overhead delimiter technique, described below, for increasing efficiency of data transmission within frames over the network. The low overhead delimiter can also be referred to as a single symbol delimiter (SSD). The SSD may be used in an OFDM system as a start of frame (SOF) delimiter. In some implementations the SSD may also be used as a delimiter for other waveforms such as acknowledgements (e.g. ACK/SACK) or request to send/clear to send (RTS/CTS) waveforms. A delimiter symbol is usually transmitted before a sequence of symbols that make up a frame. In some implementations, a delimiter symbol can include carriers encoded with a pilot sequence that confirms the presence of the frame near an estimated arrival time. The pilot sequence is also referred to as a preamble. A delimiter symbol can also serve as a timing reference for adjusting the sampling times for the sequence of symbols that follow the delimiter, and provide an estimate of the channel characteristics (e.g., impulse response and/or frequency response). In some implementations, the delimiter symbol also includes data carriers that are encoded with overhead data and/or payload data. For example, frame control data carriers can be encoded with data used in the MAC layer protocol, and payload data carriers can be encoded with at least a portion of the payload of the frame, such as a higher layer packet. The frame control information is also referred to as header. In some implementations, a short frame can be used for the delimiter symbol. In some cases, a short frame can include the delimiter symbol modulated with frame control data (e.g., an acknowledgement frame indicating a previous frame has been received), or both frame control data and a short payload that fits within the delimiter symbol. In some cases, the pilot carriers within a delimiter symbol can be used for an initial channel estimate for decoding the non-pilot data encoded on other carriers of the delimiter symbol. Both the pilot carriers and the non-pilot data carriers can then be used to form a more accurate channel estimate for decoding data from symbols following the delimiter symbol.

In some implementations, the network configuration 100 uses a "central coordinator" (CCo) station. Any station (e.g. 102B) can be designated to serve as the CCo station in a particular network configuration. The CCo is a communication station that provides certain coordination functions for at least some of the other stations in the network configuration 100. A set of stations operating under the coordination of a single CCo is called a Basic Service Set (BSS). Functions performed by the CCo can include one or more of: authentication of stations upon joining the BSS, provisioning of identifiers for stations, and scheduling and timing of medium access. In some implementations, the CCo broadcasts a repeated beacon transmission from which the stations in the BSS can determine scheduling and timing information. This beacon transmission can include fields that carry information used by the stations to coordinate communication. While the format of each of the repeated beacon transmission is substantially similar, the content typically changes in each transmission. The beacon transmission is repeated approximately periodically, and, in some implementations, is synchronized to a characteristic of the communication medium 110. In some cases, a Proxy Coordinator (PCo) can be used to manage stations that are "hidden" from the CCo (e.g., stations that do not reliably receive signals from the CCo).

In some implementations, the network interface modules 106 use protocols that include features to improve performance when the network configuration 100 includes a communication medium 110 that exhibits varying transmission characteristics. For example, the communication medium 110 may include AC power lines in a house, optionally coupled to other media (e.g., coaxial cable lines).

Power-line communication systems use existing AC wiring to exchange information. Owing to their being designed for low frequency transmissions, AC wiring provides varying channel characteristics at the higher frequencies used for data transmission. For example, the channel characteristics can change depending on the wiring used and the actual layout. To increase the data rate between various links, stations may adjust their transmission parameters dynamically. This process is called channel adaptation. Channel adaptation includes providing adaptation information that specifies a set of transmission parameters that can be used on each link. Adaptation information can include parameters such as the frequencies used, modulation parameters, and the forward error correction (FEC) scheme.

The communication channel between any two stations provided by the communication medium 110 may exhibit varying channel characteristics such as periodic variation in noise characteristics and frequency response. To improve performance and QoS stability in the presence of varying channel characteristics, the stations can synchronize channel adaptation with the frequency of the AC line (e.g., 50 or 60 Hz). In general, the phase and frequency of the AC line cycle exhibit variations that depend on the power generating plant producing the AC line, along with local noise and load changes. The synchronization with the frequency of the AC line enables the stations to use consistent channel adaptation optimized for a particular phase region of the AC line cycle. An example of such synchronization is described in U.S. patent application Ser. No. 11/337,946, filed Jan. 23, 2006, the entire content of which is incorporated herein by reference.

Another aspect of mitigating potential impairments caused by the varying channel characteristics involves using a robust signal modulation format such as OFDM. An exemplary communication system that uses OFDM modulation is described below.

Any of a variety of communication system architectures can be used to implement the portion of the network interface module 106 that converts data to and from a signal waveform that is transmitted over the communication medium. A communication protocol for an application running on a station provides and receives data to and from the network interface module 106 in segments or "packets" that are carried within the payload of a frame. A "MAC Protocol Data Unit" (MPDU) is a frame that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols" and a frame is made up of one or more symbols. Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$, measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f = 1/T_s$. The phases $\Phi_i$, and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
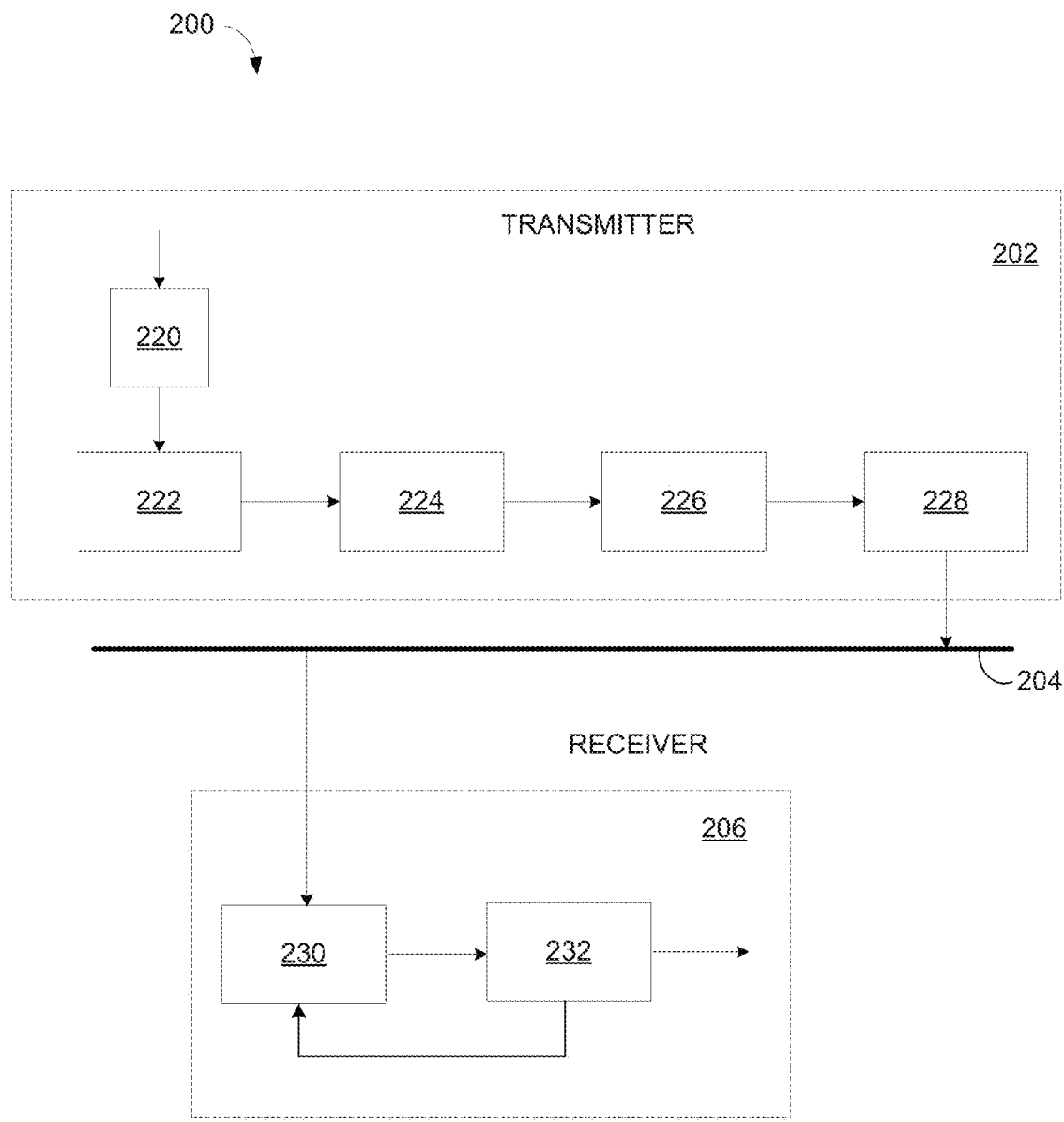
FIG. 2 is a block diagram of a communication system.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module 106 at each station. The communication medium 204 provides a "channel" that represents a path from one station to another over the communication medium 110 of the network configuration 100.

At the transmitter 202, modules implementing the PHY layer receive an MPDU from the MAC layer. The transmitter 202 includes an encoding module, 220, a mapping module 222, a modulation module 224, a post-processing module 226, and Analog Front End (AFE) module 228. The transmitter 202 forms the sequences of symbols that are to be transmitted over the communication medium 204, including the delimiter symbol at the beginning of the sequence (called a "symbol set") as described in more detail below.

Figure 3:
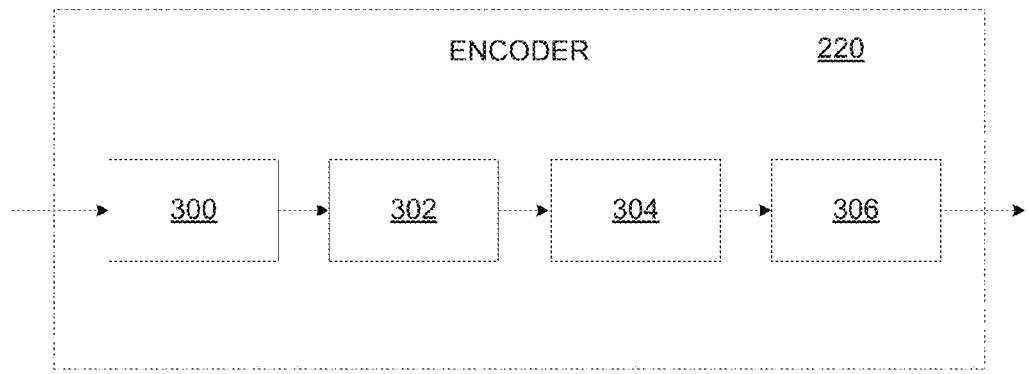
FIG. 3 is a block diagram of an encoding module.

The MPDU is processed in an encoding module 220 to perform processing such as scrambling, convolutional coding, interleaving, and diversity copying. Referring to FIG. 3, an exemplary encoding module 220 includes a scrambler 300, an encoder 302, an interleaver 304, and a diversity copier 306.

The scrambler 300 gives the information represented by the MPDU a more random distribution (e.g., to reduce the probability of long strings of zeros or ones). In some implementations, the data is "XOR-ed" with a repeating Pseudo Noise (PN) sequence using a generator polynomial such as:

$$S(x) = x^{10} + x^3 + 1 \qquad \text{(Eq. 1)}$$

The state bits in the scrambler 300 are initialized to a predetermined sequence (e.g., all ones) at the start of processing an MPDU. Scrambled information bits from the scrambler 300 can be encoded by an encoder 302 that uses any of a variety of coding techniques (e.g., convolutional codes). The encoder 302 can generate a stream of data bits and in some cases auxiliary information such as one or more streams of parity bits. For example, the encoder 302 can use a Turbo code to generate, for each block of m input information bits, a block of m "data bits" (d) that represent the input information, a first block of n/2 "parity bits" (p) corresponding to the information bits, and a second block of n/2 parity bits (q) corresponding to a known permutation of the information bits. Together, the data bits and the parity bits provide redundant information that can be used to correct potential errors. This scheme yields a code with a rate of m/(m+n).

The interleaver 304 interleaves the bits received from the encoder 302. The interleaving can be performed, for example, on blocks corresponding to predetermined portions of an MPDU. The interleaving ensures that the redundant data and parity bits for a given block of information are distributed in frequency (e.g., on different carriers) and in time (e.g., on different symbols) to provide the ability to correct errors that occur due to localized signal interference (e.g., localized in time and/or frequency). The interleaving can ensure that the redundant information for a given portion of the MPDU is modulated onto carriers that are evenly distributed over the OFDM bandwidth so that limited bandwidth interference is not likely to corrupt all of the carriers. The interleaving can also ensure that the redundant information is modulated onto more than one symbol so that broadband but short duration interference is not likely to corrupt all of the symbols.

In some modes of communication, called ROBO modes, the diversity copier 306 performs additional processing to generate increased redundancy in the output data stream. For example, ROBO mode can introduce further redundancy by reading a buffer location multiple times at different cyclic shifts to represent each encoded bit by multiple bits at the output of the encoding module 220.

Other types of encoders, interleavers, and/or diversity copiers can be used that also provide redundancy to enable each portion of an MPDU to be recovered from fewer than all of the modulated carriers or fewer than all of the modulated symbols.

Referring again to FIG. 2, the encoded data is fed into the mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ (or "tones") within the OFDM bandwidth are used by the system 200 to transmit information according to a "tone mask." For example, some carriers that are likely to interfere with licensed entities in a particular region (e.g., North America) can be avoided, and no power is radiated on those carriers. Devices sold in a given region can be programmed to use a tone mask configured for that region. The mapping module 222 also determines the type of modulation to be used on each of the carriers in the tone mask according to a "tone map." The tone map can be a default tone map (e.g., for redundant broadcast communication among multiple stations), or a customized tone map determined by a receiving station that has been adapted to characteristics of the communication medium 204 (e.g., for more efficient unicast communication between two stations). If a station determines (e.g., during channel adaptation) that a carrier in the tone mask is not suitable for use (e.g., due to fading or noise) the tone map can specify that the carrier is not to be used to modulate data, but instead can use pseudorandom noise for that carrier (e.g., coherent BPSK modulated with a binary value from a Pseudo Noise (PN) sequence). For two stations to communicate, they should use the same tone mask and tone map, or at least know what tone mask and tone map the other device is using so that the signals can be demodulated properly.

The first symbol in an MPDU is usually a symbol referred to as a delimiter symbol. Some carriers in such a delimiter symbol can be used as pilot carriers. The pilot carriers can be modulated with a predetermined amplitude and phase that is known to the receiver. Such pilot carriers can be used by the receiver for various purposes. For example, the receiver can detect the presence of the pilot carriers (e.g., using a matched filter) to determine whether a delimiter symbol has been sent in an expected time slot. Any deviation of the arrival time of the delimiter symbol from an expected arrival time can be used to predict or estimate when a next symbol is to be sampled. The pilot carriers can also be used to estimate characteristics of the channel, including, for example, an impulse response of the channel and the channel's effects on known phases of the pilot carriers. The pilot carriers can be evenly distributed over a portion of the spectral region that is used. For example, every fourth carrier can be used as a pilot carrier. The remaining carriers, that are not used as pilot carriers (also referred to as data carriers or non-pilot carriers), can be used to encode data including frame control data and, in some cases, payload data. Using at least come carriers of the delimiter symbol for encoding data reduces the overhead due to the delimiter symbols, thereby improving the throughput of the system.

A modulation module 224 performs the modulation of the resulting set of N complex numbers (some of which may be zero for unused carriers) determined by the mapping module 222 onto N orthogonal carrier waveforms having peak frequencies $f_1, \ldots, f_N$. The modulation module 224 performs an inverse discrete Fourier transform (IDFT) to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (2)}$$

where the time index n goes from 1 to N, $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. To mitigate intersymbol and intercarrier interference (e.g., due to imperfections in the system 200 and/or the communication medium 204) the post-processing module 226 can extend one end of each symbol with a cyclic extension (e.g., a prefix) that is a copy of the other end of the symbol. The post-processing module 226 can also perform other functions such as applying a pulse shaping window to subsets of symbols within the symbol set (e.g., using a raised cosine window or other type of pulse shaping window) and overlapping the symbol subsets.

The modulation module 224 or the post-processing module 226 can include a spectral shaping module that further modifies the spectrum of a signal that includes modulated symbols according to an "amplitude mask" (e.g., as described in U.S. application Ser. No. 11/614,729, filed Dec. 21, 2006, incorporated herein by reference in its entirety). While the tone mask can be changed by exchanging messages among stations in a network, the amplitude mask enables a station to attenuate power transmitted on certain carriers without needing to exchange messages among the stations. Thus, the spectral shaping module enables dynamic spectral shaping in response to changing spectral constraints by adjusting the amplitude of carriers that may cause interference. In some cases, the spectral shaping module sets the amplitude of the frequency component below a predetermined limit in response to an event such as detecting a transmission from a licensed entity. The amplitude may be set below a predetermined level that is normally used for modulating the information (e.g., according to a predetermined constellation) such that the resulting radiated power does not interfere with other devices. The amplitude mask may also indicate that a carrier is to be nulled completely, i.e. the corresponding amplitude set to zero. The attenuated carriers are still processed by the receiving station even if they are transmitted with zero amplitude so that the modulation and encoding scheme is preserved.

In general, two communicating stations do not necessarily need to know what amplitude mask the other station is using (or whether the other station is using an amplitude mask at all). Therefore, in such cases, no modification of the modulation scheme between a transmitter and a receiver is necessary when an amplitude mask is used to partially or fully attenuate (i.e., turn off) a carrier. In some cases, the receiving station detects a poor signal-to-noise ratio on the attenuated carriers and may exclude them from an updated tone map (which determines how carriers within the tone mask are modulated) thereby indicating that those carriers are not being used for modulating data. In some cases, it is advantageous for the receiver to know the amplitude mask that was used by the transmitter. For example, when the receiver uses smoothing (e.g. filtering in the frequency domain to reduce the noise energy) to generate a better estimate of the channel (e.g. per carrier), then the knowledge of the transmit amplitude on each carrier can be used to properly filter the estimate without adding distortion.

In some implementations, the spectral shaping module can be included in the post-processing module 226, for example, as a programmable notch filter that reduces the amplitude of one or more narrow frequency bands in the signal.

The AFE module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. A symbol processing module 230 performs functions such as delimiter detection, time synchronization, and channel estimation to provide timing information, channel estimate information, and sampled signal values for each symbol to a Demodulator/Decoder module 232. The Demodulator/Decoder module 232 performs a discrete Fourier transform (DFT) to extract the sequence of N complex numbers representing the encoded values (by performing an N-point DFT). Demodulator/Decoder module 232 demodulates the complex DFT values to obtain the corresponding bit sequences and performs the appropriate decoding of the bits (including deinterleaving, error correction, and descrambling).

The demodulation also includes processing the received signal (e.g., after the DFT values are obtained) to remove the effects of the channel on the transmitted signal. A "coherent reference" representing the effects of the channel on the phase and amplitude of the carriers (e.g., the phase-sensitive frequency response of the channel) can be estimated from the pilot carriers received as a part of the delimiter symbol, since the transmitted pilot carriers are known by the receiver. Since the pilot carriers only represent a fraction of the carriers used in the delimiter symbol, the effects on the data carriers (which are not necessarily known by the receiver) can be interpolated based on the pilot carriers. As described in more detail below, information obtained from the demodulator/decoder module 232 about what data was originally transmitted can be fed back to the symbol processing module 230 to increase the accuracy of the coherent reference.

The symbol processing module 230 begins sampling values from the communication medium 204 at a predicted delimiter arrival time that is based on timing information such as the value of a local clock that has been synchronized to clocks of one or more other stations, and in some cases, a previously received beacon transmission if the network includes a CCo station (e.g., as described in U.S. application Ser. No. 11/339,293, filed, Jan. 24, 2006, incorporated herein by reference in its entirety). Even when timing reference is determined based on a received beacon transmission, there may still be uncertainty in the arrival time of a frame from a given station since the relative propagation delays between each of the transmitting and receiving stations and the CCo station may not be known. In some implementations, the delimiter may be provided with a cyclic extension at the beginning and/or at the end. With such cyclic extensions, there is flexibility with respect to the accuracy of the expected start time of the delimiter. Samples of signal values that occur at the beginning or end of the delimiter symbol can be excluded (if the sampling of the delimiter symbol starts late or early) since those values are repeated at both the end and beginning of the delimiter symbol. In some implementations, if the delimiter includes carriers modulated with data (e.g., from the frame control and/or payload, or acknowledgement information), the sampling of the signal is timed more precisely with respect to an expected start time of the delimiter, within some tolerance, to ensure that the carriers carrying known preamble information and unknown data remain orthogonal.

The symbol processing module 230 can also obtain timing information from the pilot carriers in the delimiter symbol. The demodulator/decoder module 232 can use such timing information to compensate for uncertainty in the prediction of the arrival time of the delimiter symbol. For example, even though information is not lost if the sampling starts late or early, a time offset can cause changes in expected phases of the DFT values. The demodulator/decoder module 232 can phase shift all of the DFT values to compensate for a time offset derived at least in part from the DFT values corresponding to the pilot carriers (since a time shift in the time domain is equivalent to a linear phase shift in the frequency domain). The time offset can also be used for determining a more accurate prediction of the time at which the delimiter symbol for a subsequent frame is to arrive at the receiver. The length of the cyclic extension (or other form of guard interval) used for subsequent symbols can be made large enough to account for any residual timing uncertainty.

After samples of the delimiter symbol have been acquired and an initial coherent reference is obtained, the symbol processing module 230 can perform "delimiter detection" to confirm the presence of the delimiter symbol. The demodulator/decoder module 232 can demodulate and decode, in some cases, concurrently with the delimiter detection, the data encoded and modulated onto the data carriers using the initial coherent reference. After the data has been correctly decoded (e.g., as confirmed by an integrity check value), the data can be re-encoded to obtain a reconstruction of the entire delimiter symbol, which can then be used as a more accurate coherent reference (since no interpolation was necessary) for demodulating and decoding the remaining payload symbols that follow the delimiter symbol.

In some cases, multiple (and progressively more accurate) coherent references can be generated iteratively. For example, if some data carriers in the delimiter symbol are used for frame control data and some data carriers are used for payload data, only the frame control data can be demodulated and decoded in the first pass to regenerate the known pilot carriers and to re-encode the frame control data onto the respective carriers of the delimiter symbol. The resulting regenerated symbol still uses some interpolation (e.g., using filtering or smoothing) for the remaining unknown payload data carriers. However, in such a case, lesser number of carriers require interpolation than in the case of the initial coherent reference. Another new coherent reference can then be obtained from the regenerated delimiter symbol and used to demodulate and decode the remaining payload data carriers. In some implementations, this process can continue by generating a third, even more accurate, coherent reference obtained from a regenerated delimiter symbol that does not use interpolation for any carriers. Such a coherent reference can then be used to demodulate and decode symbols following the delimiter symbol. The amount of processing that can be performed on the delimiter symbol may be limited by the amount of time that exists between the end of sampling of the delimiter symbol and the beginning of sampling of the next symbol.

Any of the modules of the communication system 200 including modules in the transmitter 202 or receiver 206 can be implemented in hardware, software, or a combination of hardware and software.

As network technologies progress to the next generation, the benefit of higher physical layer data rates can be better realized by reducing the overhead due to the preamble, header and acknowledgement signals.

Figure 4A:
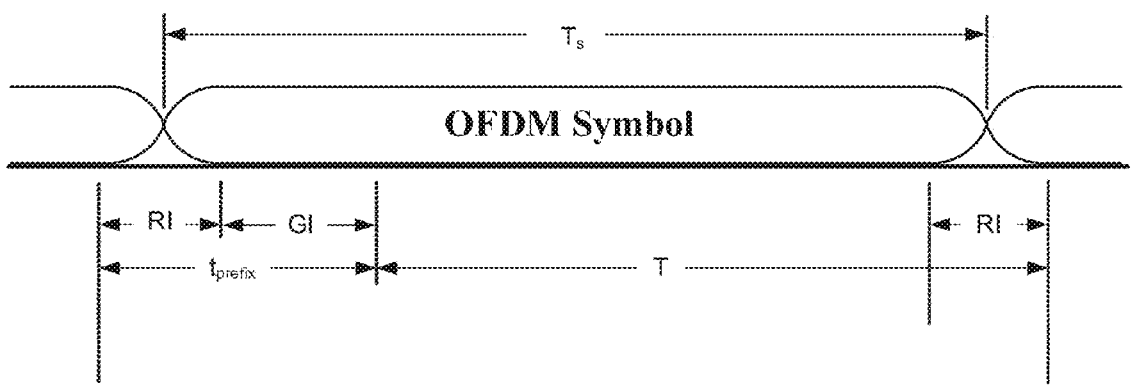
FIGS. 4A-4M are timing diagrams related to various transmission schemes.
Figure 4B:
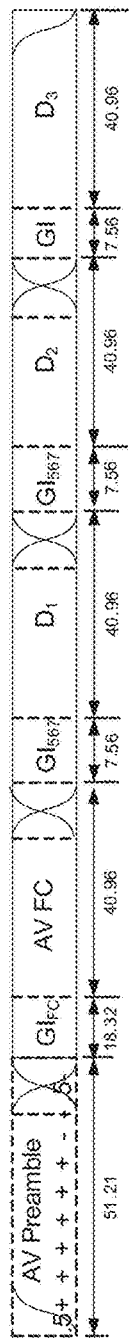

FIG. 4A shows the schematic diagram of an OFDM symbol. Referring now to FIG. 4B, an example schematic diagram of the PPDU format used in the HomePlug AV is shown. In this example, the AV preamble is multiple 5.12 microsecond OFDM symbols totaling 51.21 microseconds in length. The AV Frame Control (AVFC) OFDM symbol is 59.28 microseconds in length. The AV Preamble plus AVFC total approximately 110.5 microseconds in length. The remaining OFDM symbols contain the payload.

Figure 4C:
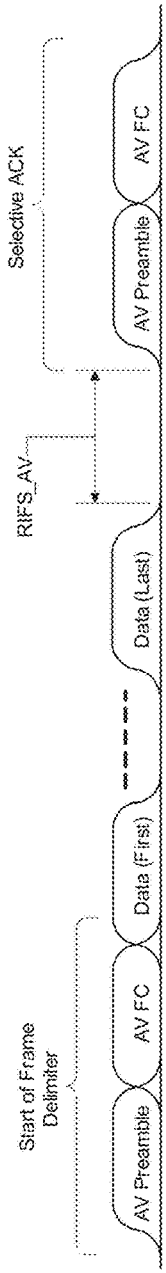

As shown in FIG. 4C, the PPDU is followed by a selective acknowledgement (SACK) which is transmitted via the additional short PPDU that includes an AV Preamble and AVFC with no payload symbols. The Response Inter-Frame Space (RIFS_AV) between the PPDU and the short PPDU is 80 microseconds in this example. Thus the total overhead for a User Datagram Protocol (UDP) payload is RIFS_AV+2*(AV Preamble length+AVFC length)=301 microseconds. Table 1 shows the effective UDP throughput and efficiency assuming a payload of 20,000 bytes of data and three different channel physical layer (PHY) data rates: 100 Mbps, 500 Mbps and 1,000 Mbps.

TABLE 1

| PHY data rate (Mbps) | 100 | 500 | 1,000 |
|---|---|---|---|
| Effective data rate (Mbps) | 84.2 | 257.6 | 347.1 |
| UDP Efficiency (%) | 84.2% | 51.5% | 34.7% |

Figure 4D:
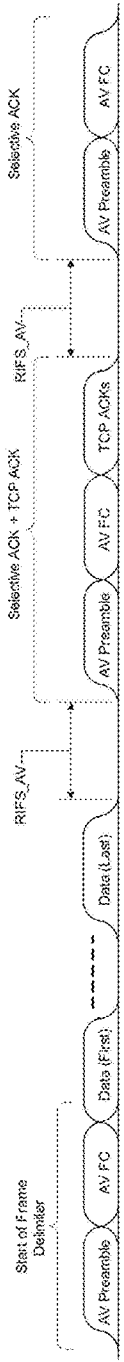

In case of Transmission Control Protocol (TCP), the overhead problem is further compounded because the PPDUs return the TCP acknowledgements thereby adding additional overhead. In HomePlug AV, a PPDU format referred to as bi-directional bursting (e.g., as described in U.S. application Ser. No. 12/118,613, filed May 9, 2008, incorporated herein by reference in its entirety) is used to reduce some of the overhead associated with the TCP acknowledgements. FIG. 4D shows an example of such a format. In the example shown in FIG. 4D, the TCP acknowledgements are fitted in a single OFDM payload symbol, which is 48.52 microseconds in length. The total overhead for a TCP payload in this example is 2*RIFS+3*(AV Preamble length+AVFC length)+OFDM payload symbol=540 microseconds.

Table 2 shows the effective TCP throughput and efficiency assuming a payload of 20,000 bytes of data and three different channel physical layer (PHY) data rates: 100 Mbps, 500 Mbps and 1,000 Mbps.

TABLE 2

| PHY data rate (Mbps) | 100 | 500 | 1,000 |
|---|---|---|---|
| Effective data rate (Mbps) | 74.8 | 186.0 | 228.6 |
| TCP Efficiency (%) | 74.8% | 37.2% | 22.9% |

A reduction in the length of the delimiter, the response inter-frame space and the OFDM symbol carrying the TCP acknowledgements can help to yield the benefit of higher PHY data rates (e.g. greater than 100 Mbps). In general, shortening the length of the delimiter may adversely affect the reliability of the delimiter, especially in a noisy medium. Delimiters are designed in accordance with the channels that they operate in. For example, in case of the HomePlug AV, the delimiter is designed to be short while providing reliable detection on channels where the signal-to-noise (SNR) ratio is lower than 0 dB. In general, at least 1 full OFDM symbol is required in the HomePlug AV to provide a reliable estimate of the channel to decode the payload OFDM symbols.

Figure 7A:
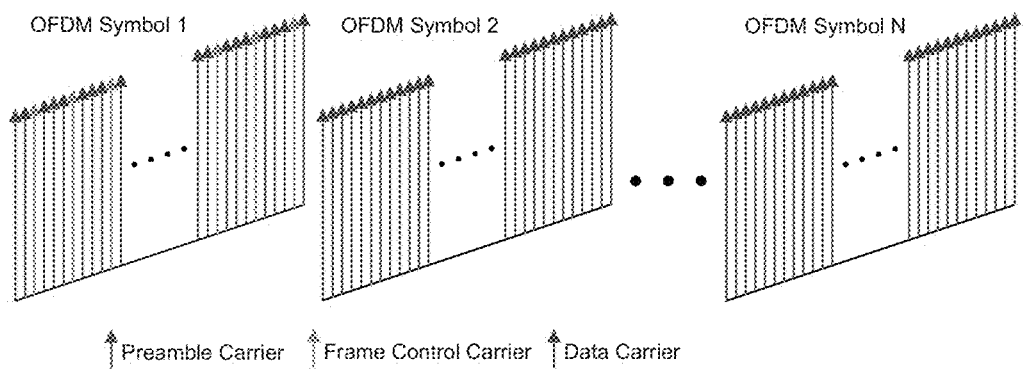
FIG. 7A is a schematic diagram showing an exemplary encoding scheme for an OFDM symbol.

In some implementations, the preamble, frame control and optionally at least a part of the payload can be encoded in an OFDM symbol delimiter in order to reduce the overhead due to the delimiter. An example of such an encoding scheme is shown in FIG. 7A. In such schemes, all transmissions use TDMA and are well synchronized. In addition, the start of the PPDU is usually known at the receiver.

Figure 4E:
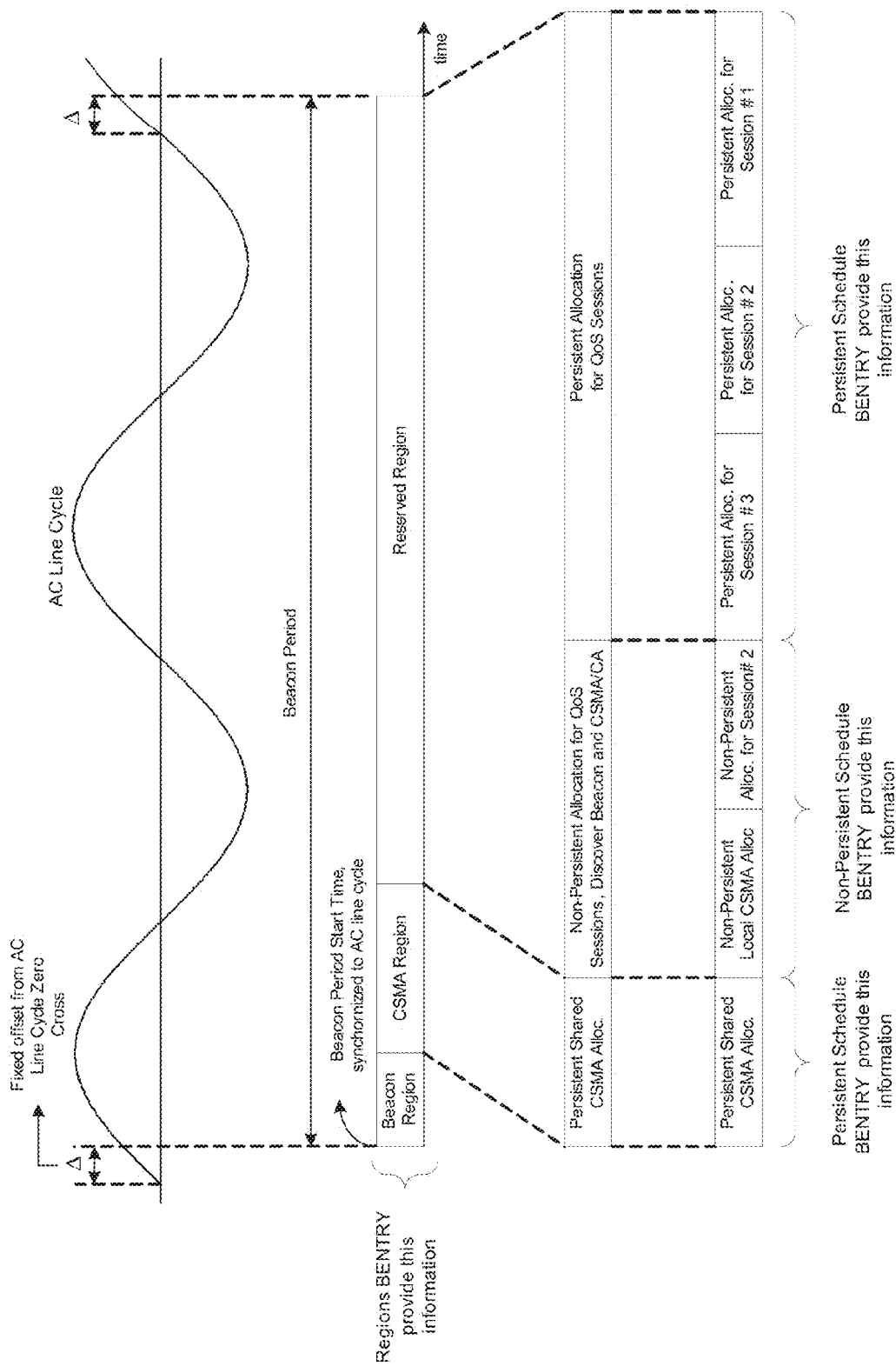

In some implementations, where a single OFDM symbol delimiter is used, the starting point of the PPDU has to be detected accurately. This can be done for example, by detecting the preamble. In general, the beginning of the PPDU is not known in advance by the receiver in case of asynchronous transmissions such as CSMA. In some implementations, a predefined time, for example the HomePlug AV Beacon Period (shown in FIG. 4E), and a network time base can be used to provide the synchronization for supporting reliable start of PPDU detection and decoding, in cases where a single OFDM symbol delimiter is used. Such synchronization is also described in U.S. application Ser. No. 11/337,946, filed Jan. 23, 2006, and U.S. Pat. No. 7,558,294, the entire contents of which are incorporated herein by reference.

In some implementations, the time duration of the delimiter (also referred to as a start of frame (SOF) delimiter), can be reduced, for example to 55 microseconds or less. In some implementations, the time duration of the SACK can also be reduced, for example to 27 microseconds or less. Such reductions in the durations of the delimiter and SACK can be achieved using shortened (e.g. of half or smaller length) OFDM symbols. The length of the shortened OFDM symbols can be adjusted in accordance with the channel. For example, the length can be shorter for good channels and longer for bad ones. For beacon transmissions in such cases, longer AV Preamble can be used to increase the chance that all stations in the network will detect the bacon transmissions.

For UDP, assuming a half symbol SACK with a reduced RIFS, for example to 20 microseconds, using delayed acknowledgements, the overhead is: SOF delimiter+RIFS+SACK. In the current example, the overhead equals 102 microseconds. In some implementations, the RIFS could be significantly shorter than 20 microseconds (in some cases even close to zero) and could be dependent on and negotiated between the transmitter and receiver (specified by the receiver).

Figure 4F:
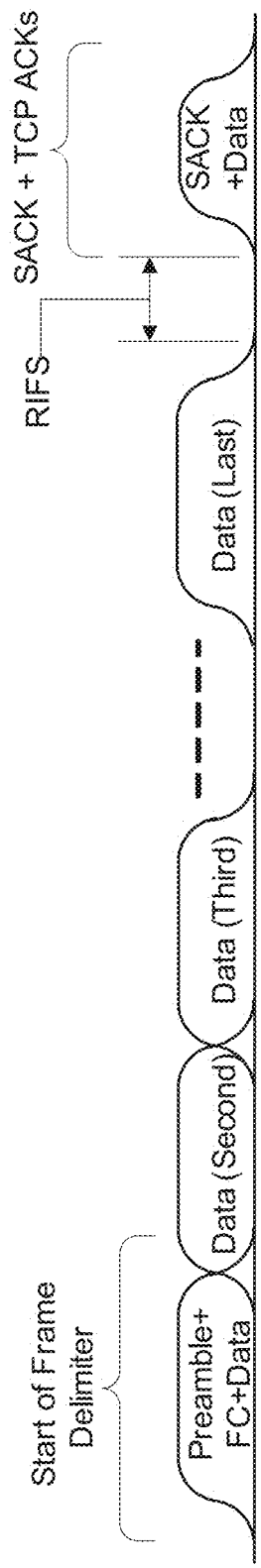

In case of TCP (as example of which is shown in FIG. 4F), assuming a half symbol length SACK with TCP acknowledgement payload, delayed acknowledgements for the last PHY block(s) such that the RIFS can be reduced, for example to 20 microseconds, and the acknowledgement for the TCP ACKs delayed, for example to the SOF of next transmission, the overhead can be calculated as: SOF delimiter+RIFS+SACK. In this example, the overhead therefore is 102 microseconds.

Table 3 shows the effective UDP and TCP throughput and efficiency assuming a payload of 20,000 bytes of data and three different channel physical layer (PHY) data rates: 100 Mbps, 500 Mbps and 1,000 Mbps. It can be seen from Table 3 that the throughput and efficiency can be significantly increased by using shortened and delayed SACKs.

TABLE 3

| Data rate (Mbps) | 100 | 500 | 1,000 |
| --- | --- | --- | --- |
| Effective PHY rate (Mbps) | 94.0 | 379.1 | 610.7 |
| TCP/UDP Efficiency (%) | 94.0% | 75.8% | 61.1% |

Single OFDM Symbol Delimiter for MIMO

Figure 7B:
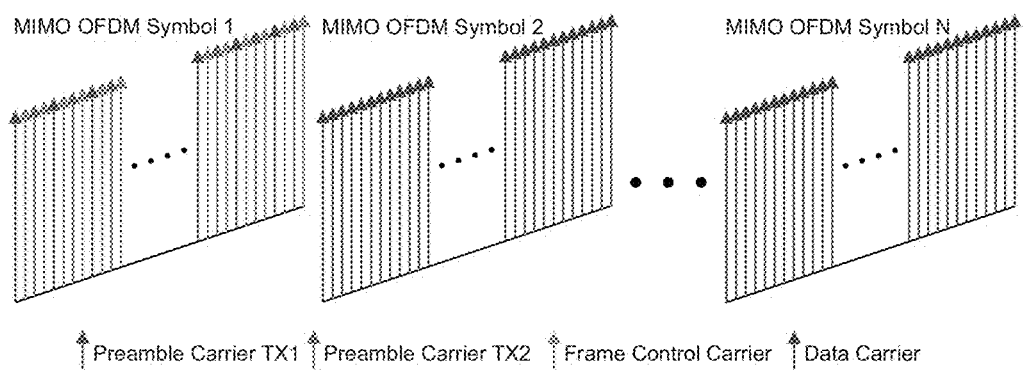
FIGS. 7B and 7C are schematic diagrams showing exemplary encoding schemes for MIMO OFDM symbols.

Sets of preamble carriers may be assigned to each of N transmitters in a N×M multiple-input/multiple-output (MIMO) system where N is the number of transmitters (or transmitting antennas) and M is the number of receivers (or receiving antennas) and where M is typically equal to or greater than N. An example encoding scheme for a MIMO system is shown in FIG. 7B. In this example (for 2×2 MIMO on the power line), 25% of the preamble carriers are assigned to one of the two transmitters and another 25% of the preamble carriers are assigned to the other transmitter. In some implementations of MIMO systems for operation on power line media multiple antennas can be implemented using different pairings of the three conductors of the power line medium (Line, Neutral, and Ground). For example, stations may use a voltage applied between the Line-Neutral conductors as the first antenna and a voltage applied between the Line-Ground conductors as the second antenna for transmitting and receiving the MIMO signal. Assuming the length of the impulse response of the channel is less than ¼ of the symbol length for the single symbol delimiter (SSD), the receiver may obtain an accurate estimate of the complete MIMO channel matrix for all carriers by interpolating the carriers from each set of preamble carriers from each transmitter. The assumption that the channel impulse response is ¼ of the SSD length is made since 25% of the carriers are used for each preamble. In this example, another assumption is that the carrier spacings are uniform for each set of preamble carriers. The second assumption may also be made for non-MIMO systems. While the MIMO SSD may still include frame control carriers and payload carriers, in general, the number of such non-preamble carriers is less as compared to non-MIMO systems. In some implementations, the number of preamble carriers required for the MIMO SSD depend on one or more of the carrier spacing, the length of the impulse response of the channel, and the signal to noise ratio of the carriers at the receiver. The portions of the SSD carriers assigned to the preamble, frame control and payload may be selected based on various channel conditions.

The complete MIMO channel matrix for 2×2 is computed in 4 steps.

1. The preamble carriers transmitted by the first transmitter (TX1) and received by the first receiver (RX1) are interpolated and optionally filtered to obtain an estimate for the first matrix element H11 for all carriers.

2. The preamble carriers transmitted by TX1 and received by the second receiver (RX2) are interpolated and optionally filtered to obtain an estimate for the second matrix element H12 for all carriers.

3. The preamble carriers transmitted by TX2 and received by RX1 are interpolated and optionally filtered to obtain an estimate for the third matrix element H21 for all carriers.

4. The preamble carriers transmitted by TX2 and received by RX2 are interpolated and optionally filtered to obtain an estimate for the fourth matrix element H22 for all carriers.

Each of the above four steps may be executed independently of the others. For example, the steps may be executed in any order or even in parallel. Once the 2×2 MIMO channel matrix is computed, decoding of the MIMO payload is performed by applying the matrix to separate the individual frame control and/or payload streams from each transmitter TX1 and TX2.

The frame control may be encoded in various ways. In some implementations, the frame control is encoded, and then copy encoded for redundancy. The encoding may also include error control coding such as FEC encoding. In some implementations, the encoded frame control stream is divided into multiple data streams, one data stream for each transmitter. In the case of copy encoding, the multiple streams may be sub-divided such that information and parity bits are selected for each stream to maximize the separation in frequency for different copies of each bit. Decoding the received data at a receiver includes processing the streams at each of the multiple receivers (or receiving antennas) and combining the copies. Decoding may also include performing the FEC decoding, preferably using a turbo, low density parity check (LDPC) or similar error correction code.

Figure 7C:
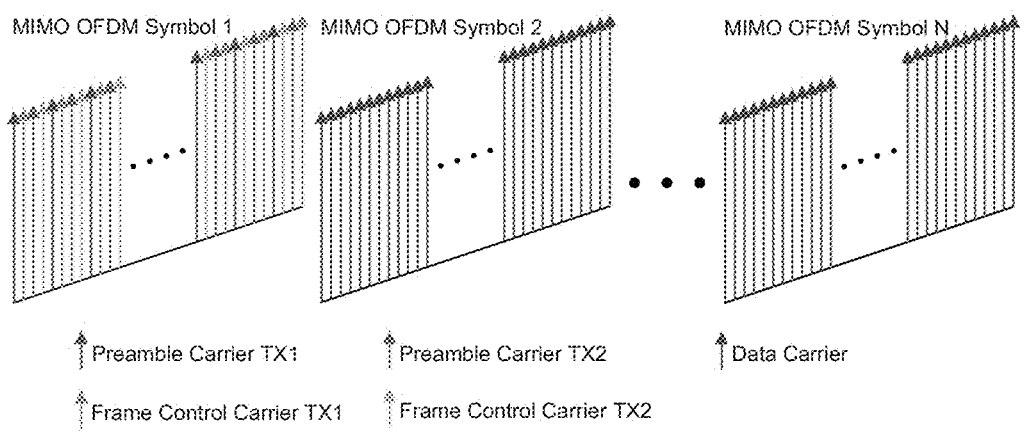

In some implementations the frame control information is encoded such that each transmitter sends a portion of the encoded frame control carriers. Example of such a scheme is shown in FIG. 7C. Such schemes for encoding the frame control can improve performance as well as the estimate of the MIMO channel matrix. FIG. 7C shows an example of 2×2 MIMO where half of the frame control carriers are transmitted by the transmitter (or transmitting antenna) TX1 and the other half are transmitted by the transmitter (or transmitting antenna) TX2. In this example, decoding of the signal at the receivers (or receiving antennas) RX1 and RX2 is performed as follows:

1. The complete 2×2 MIMO channel matrix is estimated as described above.

2. H11 is used with RX1 and H12 with RX2 to decode the frame control carriers transmitted by TX1.

3. H21 is used with RX1 and H22 with RX2 to decode the frame control carriers transmitted by TX2.

4. The complete set of frame control carriers are used to decode the frame control information, including correcting errors using, for example, an FEC scheme and copy combining, and verifying that the frame control information was correctly decoded (e.g., using a cyclic redundancy check (CRC)).

5. If the CRC of the frame control is valid, the frame control is re-encoded to generate the transmit state of the frame control carriers on TX1 and TX2 (the re-encoding and regeneration of the transmit state may include FEC encoding, generating copies, and performing modulation). Since the CRC was determined the be valid, any errors that may have existed in the frame control information before it was FEC decoded will be absent from the newly re-encoded frame control information, which enables the transmit state to be regenerated even for carriers that may have carried too much noise to properly demodulate when first received.

6. The preamble and frame control carriers transmitted by TX1 and received by RX1 are interpolated and optionally filtered to obtain a revised estimate for the first matrix element H11 for all carriers.

7. The preamble and frame control carriers transmitted by TX1 and received by RX2 are interpolated and optionally filtered to obtain a revised estimate for the second matrix element H12 for all carriers.

8. The preamble and frame control carriers transmitted by TX2 and received by RX1 are interpolated and optionally filtered to obtain a revised estimate for the third matrix element H21 for all carriers.

9. The preamble and frame control carriers transmitted by TX2 and received by RX2 are interpolated and optionally filtered to obtain a revised estimate for the fourth matrix element H22 for all carriers.

Each of the above four steps 6.-9. may be executed independently of the others. For example, the steps may be executed in any order or even in parallel.

In another approach, an additional set of carriers may be MIMO encoded with payload information and, using the MIMO channel matrix determined in steps 6.-9., the payload segment may be decoded, CRC verified and re-encoded to determine the state of the remaining carriers in the symbol. Further processing may be performed using the known preamble, known frame control and known payload carriers to estimate a more accurate MIMO channel matrix for decoding the MIMO encoded payload of the successive (or remaining) symbols.

In some implementations, filtering (or smoothing and/or interpolation) during the channel estimation includes exploiting the symbol length being significantly longer than the channel impulse response length and filtering (e.g. using a FIR filter) sets of carriers in the frequency domain to achieve the effect of windowing the estimated impulse response in the time domain. In some cases, this reduces the noise. For example, a raised cosine window may be used for windowing the impulse response where the non-zero values of the window may be a small portion of the symbol length and the remainder of the estimate of the impulse response is set to zero. In some implementations, preamble carriers are post processed to estimate the location in the impulse response where the window needs to be centered. Typically, windowing is centered around the peak of the impulse response.

Figure 8A:
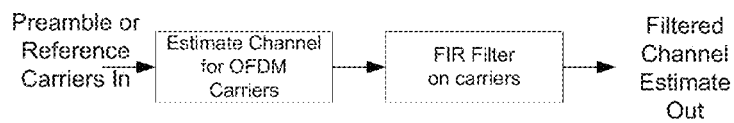
FIGS. 8A and 8B are flow diagrams depicting exemplary operations during channel estimation at a receiver.
Figure 8B:
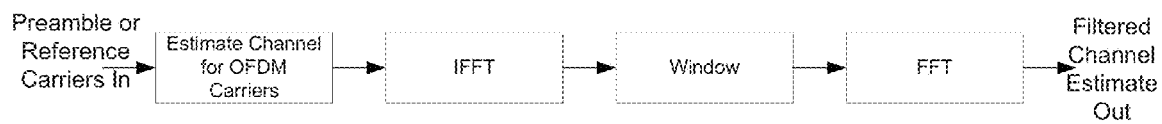
Figure 9A:
FIG. 9A shows a noisy signal.
Figure 9B:
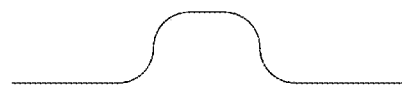
FIG. 9B shows a window function.
Figure 9C:
FIG. 9C shows a filtered signal.

FIGS. 8A, 8B depict flow charts of exemplary operations in the channel estimation process. Typically, the operations depicted in FIG. 8A achieves substantially the same effect as the operations depicted in FIG. 8B. In FIG. 8A, the channel estimates from the preamble or reference carriers are filtered using a filter (for example a digital FIR filter) in the frequency domain. The FIR filter can be a frequency domain representation of a corresponding window function. In FIG. 8B, the estimates are converted into the time domain using a transform such as an IFFT to produce an estimate of the impulse response of the channel (FIG. 9A). In some implementations, the additional post processing of the preamble carriers is done to determine the location in the impulse response where the window needs to be centered. The impulse response is multiplied by a window (such as one shown in FIG. 9B) such that noise outside the range of the window is eliminated, resulting in a noise filtered estimate of the impulse response of the channel (FIG. 9C). The noise filtered estimate can be transformed back to the frequency domain using another transform such as the FFT.

In some implementations, the CRC check on the frame control is used to determine if a valid signal is present. If the CRC is determined to be valid, then it confirms the presence of a valid start of PPDU. In some implementations, correction of preamble carriers may also be used to confirm the presence of a valid start of PPDU.

Fast (Short in Time) Carrier Sense in a Noisy Channel

In general, simple energy sense carrier detection cannot be used reliably on the powerline because of very low SNR conditions. Under such conditions, the change in energy on the channel is very small and impulse noise is typically large. Such conditions typically result in high numbers of both false negatives and false positives. Systems operating under such low SNR conditions, such as the HomePlug AV, rely on correlation based detection of the preamble signal for carrier sense.

In general, the contention slot time for systems such as the HomePlug AV is significantly less than a frame control symbol time or data OFDM symbol time. For example, the HomePlug AV detects the preamble for carrier sense by using 5.12 μS OFDM symbols for the preamble. This is typically ⅛ of the length of OFDM symbols used for frame control and payload.

Figure 4G:
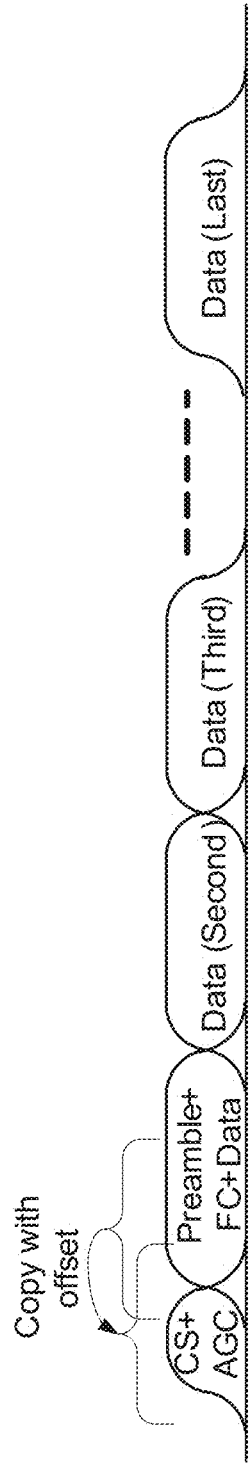

In some implementations, where carriers in a delimiter symbol are encoded with one or more of frame control and payload data in addition to the preamble, the preamble signal cannot be reliably detected unless the entire symbol is sampled. Only when the entire symbol is sampled and the preamble carriers are extracted via a transform such as the FFT, can the presence of the preamble be confirmed. When carriers in a delimiter symbol are also encoded with non-preamble data, the data on certain carriers within the delimiter (and therefore the content of the delimiter as a whole) is unknown to the receiver. In such cases, the receiver cannot perform a time-domain correlation (or matched filtering) based detection of the delimiter since the time-domain signal pattern of the delimiter is not known to the receiver. In some implementations, this is addressed by copying at least a part of the delimiter symbol and transmitting the copied portion as an extension of the delimiter just before transmitting the delimiter itself. In some implementations, the extension is a copy of a short portion at the beginning of the delimiter OFDM symbol optionally with a fixed offset. This is illustrated by way of an example in FIG. 4G. In such cases, the receiver uses correlation to compare the extension with the beginning of the delimiter symbol for carrier sense detection. If a carrier sense is detected in a contention slot, stations will defer from transmitting. In some implementations, this extension can also be used for setting the automatic gain control (AGC). In some implementations, windowing of the extension and/or the delimiter symbol is needed to maintain the spectral notches (e.g., notches used to reduce radiation into restricted bands, such as the Amateur bands). This extension is not needed for the SACK or for PPDUs sent using TDMA.

In some implementations, the extension is separated from the delimiter by a predetermined offset. The length of the offset, the length of the copy and the length of the contention slots can be selected based on one or more factors. For example, preamble detection (carrier sense) must occur within one contention slot (signal sampling plus hardware latency) in order to back-off for proper CSMA operation. In such cases, the length of the copy plus the offset must be less than the contention slot time. However, the length of the copy and offset must be long enough to support sufficiently reliable signal detection under expected channel conditions. In some implementations, the effect of windowing on signal detection reliability is also considered. In some implementations, the copy is long enough for the AGC to settle prior to sampling the delimiter signal to detect the preamble (for time synchronization and channel estimation), the frame control and if present, the payload.

The fast carrier sense mechanism enables reduction of the duration of the contention slot time to improve the performance of CSMA. Without the fast carrier sense, the whole SSD has to be processed to determine the presence of a signal (i.e., carrier sense). This results in the contention time possibly being larger than the SSD and also entails additional latency due to the increased processing. For example, in HomePlug AV, the OFDM symbol duration is 40.96 microseconds, and the contention slot time is 35.84 microseconds. Using the SSD without fast carrier sense in HomePlug AV based systems causes the contention slot time to be more than 40.96 microseconds. Using fast carrier sense maintains the contention slot time at 35.84 microseconds or in some cases reduces it further.

Synchronization

Figure 4H:
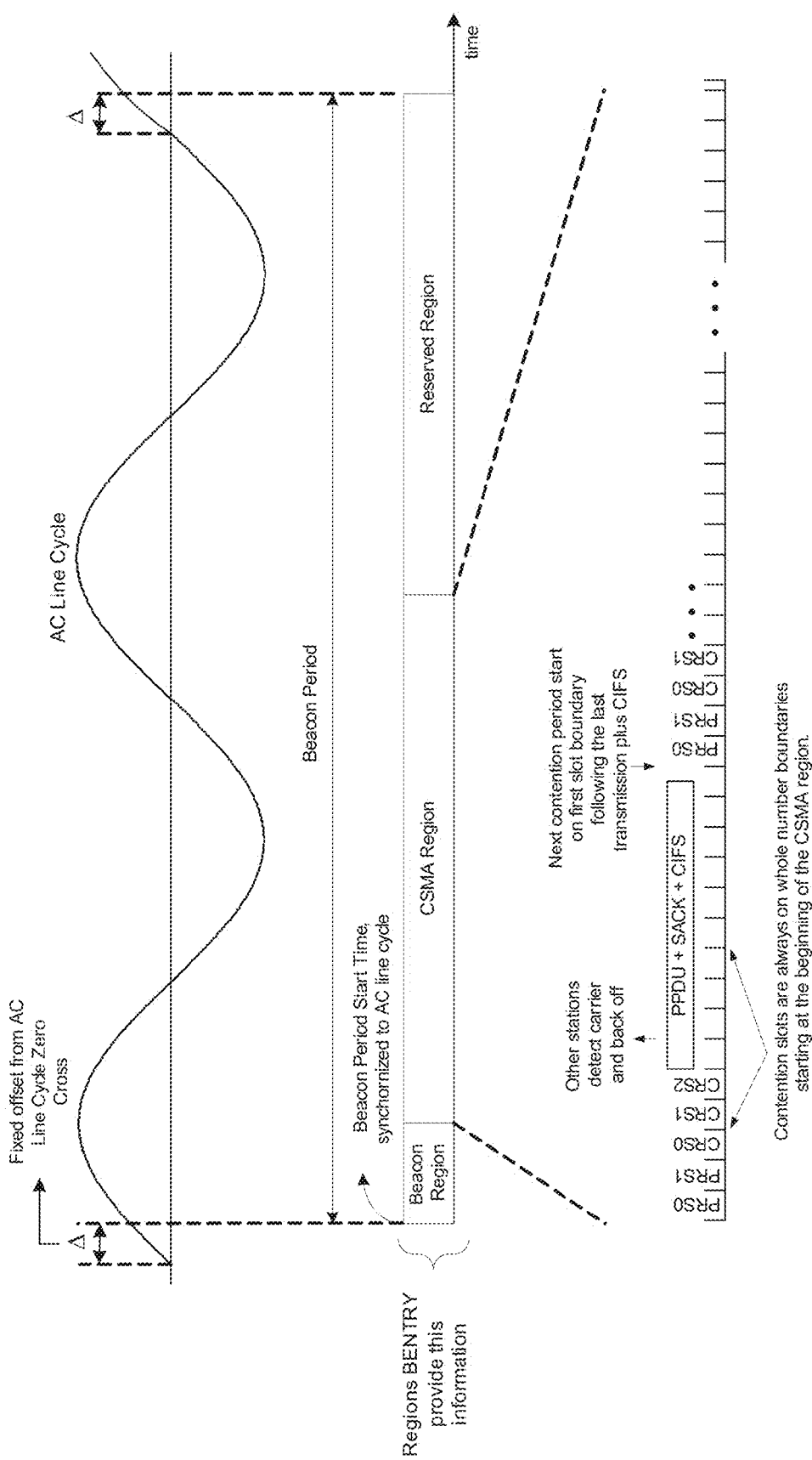

In some implementations, the contention slots include priority resolution slots (PRSs) and contention resolutions slots (CRSs) that are used that are fully synchronized with the Beacon Period. This is illustrated by way of an example in FIG. 4H. Typically, transmissions of PPDUs (excluding SACKs) are started on the CRS boundaries. PRSs are used to enable some stations to assert priority, as described in more detail below.

Figure 6:
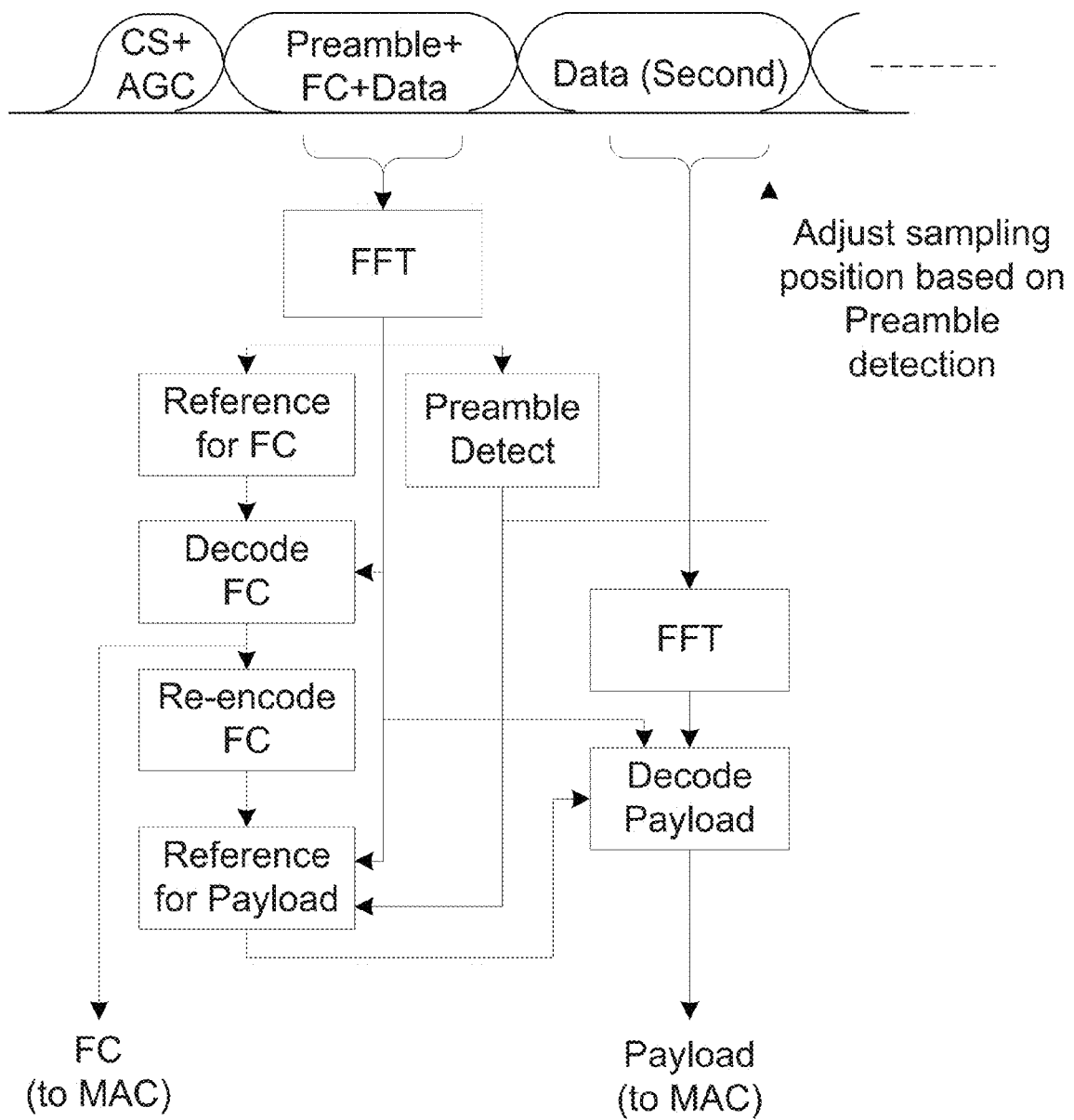
FIG. 6 is a flowchart showing exemplary operations in a decoding module.

In some implementations, the receiver samples and processes the signal to detect a carrier prior to the end of the next CRS. If a carrier is sensed, the receiver typically samples the first OFDM symbol (delimiter) and detects the preamble using correlation in the frequency domain (after a transform such as the FFT). The preamble carriers are used to estimate the timing for sampling the payload OFDM symbols following the delimiter and estimating the channel to decode the frame control. In some implementations, after successful FEC decoding and CRC check, the frame control is re-encoded and combined with the preamble to generate a better estimate of the channel to decode the payload and/or frame control in the delimiter. In some implementations, the first successfully decoded payload FEC block is re-encoded and combined with the preamble and frame control carriers to generate a better estimate of the channel for decoding the subsequent payload symbols. This process is schematically depicted as an example in FIG. 6.

In some implementations, when the transmission are done in accordance with CRS boundaries, a receiver may need to know a priori where to sample (or begin sampling) in order to detect a SSD. A continuous search, as is typically used for preamble detection, is not practical in SSD detection since the preamble, frame control and possibly payload are mixed in a single OFDM symbol. In such cases, the receiver is synchronized to a time base in accordance with the CRS boundaries. In some cases it may be necessary to compensate for propagation delay between a transmitter and a receiver. This compensation may need to be applied to the timing of a PPDU being transmitted and/or the timing of the receive sampling. This transmit and/or receive propagation delay compensation may need to be applied to the PPDU in a CSMA contention slot, a TDMA allocation or the immediate ACK (SACK) to the PPDU. In addition to the transmitter and intended recipient(s), propagation delay compensation may need to consider other stations in the network, especially for CSMA. For broadcast transmissions, the propagation delay compensation may need to be adjusted at each intended receiver.

Slot Synchronization

In some implementations, synchronization includes slot synchronization or time slot alignment between various stations in the network. In some implementations, such slot alignment can be relative to a beacon transmission. In some implementations, the beacon may be transmitted using CSMA contention. In such cases, the beacon location can vary unpredictably based on the traffic. In such case, the logical starting point of the beacon period (possibly communicated in a schedule included in the beacon transmission) can be used instead of the beacon location itself. In some implementations, the beacon location or the logical starting point of the beacon period may itself be aligned to an external signal. For example, in HomePlug AV, the beacon period is aligned, at least approximately, with the underlying AC line cycle.

In some implementations, the SSD may also be based on a network clock or time base. Such network clocks or time bases are generally maintained at a master node. The master node provides time stamps of the master clock to all stations to enable them to precisely track the network clock. In some implementations, the slot boundaries can be derived from the network clock, even if several beacon transmissions are missed.

For example, in HomePlug AV the Beacon transmitted by the master includes a time stamp of the network time base and allocation information for various intervals in the beacon period (i.e., scheduling information). The time stamps in the beacon can be used by all stations in the network to synchronize to the network time base. The scheduling information can be used to determine the start and end of TDMA allocations and CSMA allocations. In some implementations, the scheduling information can be valid for multiple beacon periods, thus enabling stations to use their allocation even if they occasionally miss a beacon signal. Stations in the network can combine the knowledge of the scheduling information along with the network time base to determine the slot boundaries. For example, the first slot boundary of an allocation can be aligned to the start of the allocations, and all subsequent slot boundaries can be determined based on the knowledge of slot duration and the network time base.

In some implementations, CSMA transmissions use slot boundaries to determine where priority resolution signals need to be transmitted. A priority resolution signal enables a station to indicate a priority of traffic, thus allowing higher priority traffic to be transmitted before lower priority traffic. Priority resolution slots (PRSs) for transmitting the priority resolution signals are followed by CRSs where stations that have the highest priority traffic contend for channel access. CRSs also use the slot boundaries for detecting start of transmission from other stations.

In some implementations, TDMA transmissions can also use slot boundaries. For example, the first transmission in a TDMA allocation can start at the first slot boundary of the TDMA allocation. All subsequent transmissions in the TDMA allocation start at other slot boundaries. This approach enables the receiver(s) that missed one or more transmission to receive subsequent transmissions.

In some implementations, new or recently added stations have a mechanism to obtain the slot synchronization information. For example, a new station may automatically derive the slot synchronization by processing the observed SSD signals with various predetermined slot offsets. In some implementations, the master of the network may transmit special signals (e.g., beacons) that do not require slot synchronization in order to be detected (e.g., Beacon transmissions that do not use the SSD, but use a legacy preamble and frame control). Such special signals enable new stations to quickly determine the slot alignment. This information can also be used by existing stations to maintain their slot alignment.

Delayed Selective Acknowledgement

In some implementations, for example in protocols such as the HomePlug AV, a SACK is transmitted immediately after a PPDU to indicate to the transmitter one or more of the following: 1) that a number of segments were properly received, 2) that there was no collision (in the case of CSMA) and 3) that the current set of tone maps (bit loading) is still appropriate (e.g., the channel has not changed substantially). In some implementations, the use of a SSD allows for less processing time to generate the SACK signal since the preamble is no longer a fixed signal that is independent of the content of the SACK transmission. In such cases, a longer Response InterFrame Space (RIFS) than what is typically available may be required to generate the complete encoded SACK signal. For example, in the case of using a SSD in future versions of HomePlug AV 1.1 (referred to as HomePlug AV 2.0), since the preamble is no longer an independent signal, approximately 50 microseconds less than the time required is available to decode the last segment and generate (using existing hardware) the entire SACK than was available in the previous version of HomePlug AV 1.1 where both the RIFS and preamble signal time could be used. In some implementations, hardware with increased complexity (and cost) could be used to provide faster processing such that the entire SACK signal can be generated within the typically available RIFS. In some implementations, a partial SACK signal (i.e. a SACK that acknowledges a subset of segments received) may be used as the SACK immediately following a PPDU in order to avoid increasing the RIFS required, and possibly enable reducing the RIFS. In such cases, the number of segments acknowledged in the partial SACK may be determined such that the decoding of the segments and the encoding of the SACK signal for that many segments may be processed within the available RIFS. In such cases, the SACK protocol is changed such that some segments, for example ones that end in the last OFDM payload (data) symbol of the PPDU are not acknowledged until a future transmission. An example of such a delayed SACK scheme is schematically shown in FIG. 4I.

Figure 4I:

In the example depicted in FIG. 4I, the processing time to generate the SACK includes the RIFS and the length of the last OFDM payload (data) symbol. In some implementations, the segments that end in the last two or more OFDM payload symbols could be acknowledged in a future SACK to provide even more processing time for the hardware to generate the SACK immediately following the PPDU. Using this mechanism, the RIFS may be reduced to near zero with moderate hardware processing complexity and speed. In the example depicted in FIG. 4I, the segments that are not acknowledged in an immediate SACK are acknowledged in a future SACK. In some implementations, the transmitter may send a request to obtain the acknowledgement information for the unacknowledged segments. For example, if the transmitter does not have any pending data, it may send the request and the receiver responds with the pending acknowledgement information.

Other approaches can also be used to communicate the unacknowledged segments. In some implementations, the receiver can include the acknowledgment information as a part of any transmission it sends to the transmitter. For example, if the receiver has any pending data to the transmitter, it can include the acknowledgement information in the frame control of such transmission. The receiver may also send control frames that include the acknowledgement information.

The delayed acknowledgment scheme can be used even when a single symbol delimiter (SSD) is not used. For example, the delayed acknowledgment scheme can be used to reduce the response interframe space (RIFS) in HomePlug AV. The delayed acknowledgment scheme can also be combined with MPDU bursting in HomePlug AV. For example, the transmitter may send a burst of four MPDUs and the receiver in response transmits a SACK that includes acknowledgement information for all segments in the first three MPDUs and for a portion of the segments in the fourth MPDU. The unacknowledged segments in the last MPDU can be acknowledged using a delayed acknowledgement scheme, for example by using a future SACK.

In some implementations the transmitter can determine whether delayed acknowledgements can be used for different transmissions. For example, for delay sensitive traffic like Voice-over-Internet Protocol (VoIP), a transmitter can request the receiver to provide an acknowledgement immediately for the whole payload. In some implementations, delayed acknowledgements can only be used if there is consistent traffic to the receiver. This reduces the likelihood of sending a separate transmission for just getting the acknowledgement on the data for which the acknowledgement is delayed. In some implementations, a transmitter can indicate in the frame control information whether delayed acknowledgements can be used for the payload. In some implementations, a transmitter can also communicate the portion of the payload for which delayed acknowledgements are needed. For example, the transmitter can choose whether delayed acknowledgments are needed for the payload in the last OFDM symbol or the last two OFDM symbols. In some implementations, the transmitter can use the number of bytes and/or duration of a payload (e.g., in number of OFDM symbols) to determine whether delayed acknowledgements can be used for a transmission. For example, the transmitter can use delayed acknowledgement when the number of bytes is larger than a predetermined threshold.

In some implementations, the receiver can also determine whether to use delayed acknowledgements. For example, the receiver can use the number of bytes in the payload or a duration of the payload to determine whether the receiver will delay the acknowledgements for some portion of the payload. In some implementations, the transmitter and receiver can negotiate (for example, using management messages) with one another the parameters associated with the delayed acknowledgements before the delayed acknowledgments are used.

In some implementations, the delayed acknowledgements can be used for traffic with specific characteristics. For example, the delayed acknowledgements may be turned-off for high priority traffic, and only used for lower priority traffic. This enables high priority traffic to be delivered with lower latency.

Figure 11A:
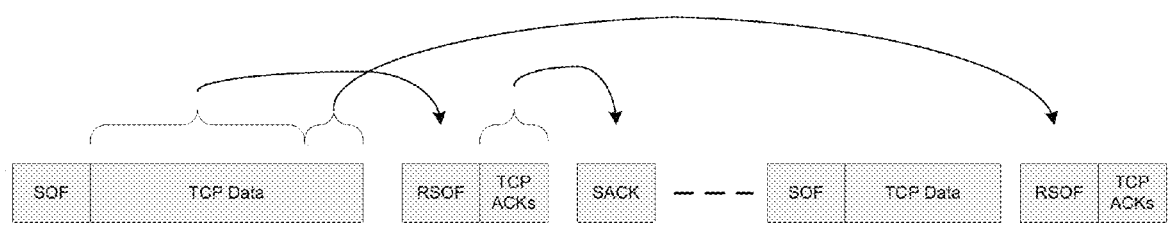
FIGS. 11A-11C show timing diagrams related to delayed acknowledgements.

Delayed acknowledgement can be used with UDP traffic as well as TCP traffic. Delayed acknowledgements can be combined with bidirectional bursting for TCP traffic in HomePlug AV (e.g., exemplary implementations of bidirectional bursting are described in U.S. Patent Publication No. 2008/0279126, incorporated herein by reference). FIG. 11A shows an example combining delayed acknowledgements with bidirectional bursting. In this example, the Start of Frame (SOF) delimiter followed by TCP Data is sent by the transmitter. A portion of the TCP data is immediately acknowledged (i.e., using MAC layer acknowledgement) by the receiver using the Reverse Start of Frame (RSOF) that immediately follows the TCP Data. MAC layer acknowledgement for the remainder of the TCP data is included in a subsequent RSOF. RSOF can be followed by TCP acknowledgements. In this example, the TCP acknowledgements are immediately followed by MAC layer acknowledgments by the transmitter. The MAC layer acknowledgements use a separate selective acknowledgement (SACK) delimiter. This enables the TCP ACKs that were corrupted to be retransmitted in response to the MAC layer SACK.

Figure 11B:
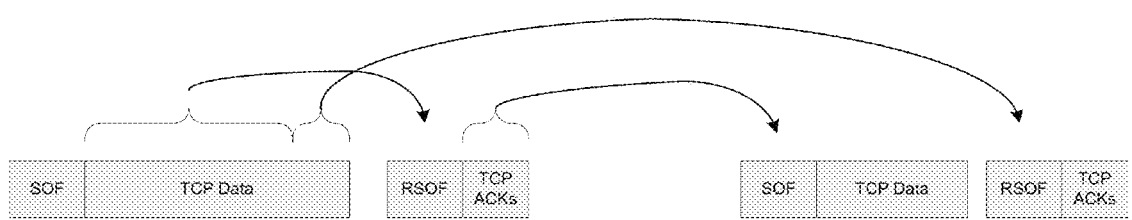

FIG. 11B shows another example of combining delayed acknowledgements with bidirectional bursting. In this example, a portion of the TCP data is immediately acknowledged (i.e., using MAC layer acknowledgement) by the receiver using the RSOF that immediately follows the TCP Data. MAC layer acknowledgement for the remainder of the TCP data is included in a subsequent RSOF. RSOF is followed by TCP acknowledgements. MAC layer acknowledgement for the TCP acknowledgements can be transmitted in the next SOF delimiter. This approach makes more efficient use of the medium by including the acknowledgement for the TCP Acknowledgements in the SOF.

In the above example, SOF, RSOF and SACK can use either SSD format or some other format. For example, the SOF can use the HomePlug AV 1.1 delimiter format, while the RSOF uses the SSD format. The MAC layer acknowledgements can use a variety of approaches including selective acknowledgements, communicative acknowledgements etc. In some implementations, the MAC layer acknowledgements for the TCP acknowledgements can also use delayed acknowledgments.

When a station transmits acknowledgements for data for which acknowledgements were previous delayed, the station may have to make sure that the transmitter can clearly map the acknowledgements to the corresponding data. In some implementations, the data can be divided into segments, with each segment assigned a sequence number. The station transmitting the acknowledgements can include the sequence numbers of the segments to which the acknowledgements correspond. In some implementations, each MPDU or burst of MPDUs can include a MPDU sequence number or a MPDU burst sequence number, respectively. When a station transmits an acknowledgement for the MPDU or MPDU Burst, the station can either implicitly or explicitly indicate the MPDU or MPDU Burst to which the acknowledgement corresponds. This enables the receiver to properly map the acknowledgements to the corresponding data.

Figure 11C:
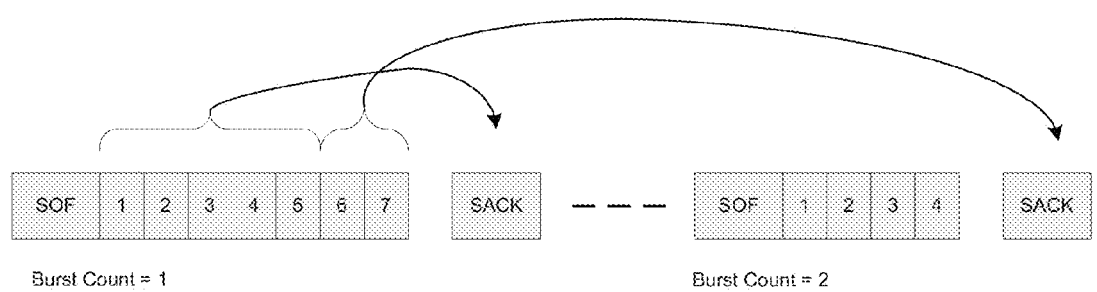

FIG. 11C shows an example that illustrates binding the delayed acknowledgements to the corresponding data. In this example, a transmitter sends a SOF with seven data segments in a payload. The transmitter includes a burst count field that is set to 1 to identify this MPDU. A SACK that follows the seventh data segment, provides acknowledgement to the first five data segments. Acknowledgement for data segments 6 and 7 is delayed. The transmitter at some later time sends another MPDU with burst count set to 2. This receiver sends a SACK that includes the delayed acknowledgements for data segments 6 and 7 in the MPDU with burst count=1. In this example, the station transmitting the SACK will automatically include the delayed acknowledgements for burst count=N−1 in a SACK for Burst Count=N. This can enable proper mapping of delayed acknowledgments to the corresponding data. For example, if in FIG. 11C, the SACK transmitted immediately after the MPDU with burst count=1 is not received, the transmitter can retransmit the same data with burst count=1. This enables the receiver to know that this is a retransmission and thus to only include delayed acknowledgement information for MPDU with Burst Count=0.

Compensation for Propagation Delay

Reliable detection of SSD requires that the signal from a transmitter is received at the receiver(s) at the expected location. As described above, slot synchronization, or an alignment of the SSD with slot boundaries at the receiver and/or transmitter, may be needed for reliably detecting the SSD. In general, propagation delays incurred by the signal will impact the SSD alignment with the slot boundaries at the receiver. In some implementations, the propagation delay can be compensated at one or more of the transmitter and the receiver(s). In some implementations, the transmitter compensates for the propagation delay by transmitting the SSD signal in the slot but with the timing adjusted earlier based on a propagation delay from a station providing the timing to the transmitter. In such a case, all transmissions that begin in a slot occur at the same time, but may arrive at different times at each receiver.

In some implementations, the receiver adjusts the timing such that the SSD signal from the transmitter is received at a known (or predictable) time. In such cases, the receiver may continuously (or on an as a needed basis) adjust its timing to maximize the detection reliability of the SSD.

In some implementations, a combination of the above approaches may also be used. In general, transmitter and receiver may also measure the propagation delays and use the measured information as a part of their propagation delay compensation technique.

In some implementations, the transmitter adjusts the transmit time to ensure that it is received at the intended receiver at the time expected by the receiver. In such cases, the transmitter compensates for both the propagation delay from the station providing the timing to the transmitter and also the propagation delay from the transmitter to the receiver.

In some implementations, an extended guard interval (GI) enables a receiver to tolerate offset of the SSD signal from the slot boundaries. The extended guard interval also adds additional overhead, thus reducing the signaling efficiency.

When SSD is used in TDMA allocations, and where there are a single transmitter and a single receiver, one or more of the above approaches can be used. For example, a transmitter may use propagation delay compensation along with some additional GI on the SSD to accommodate for channel variations and/or propagation delay estimation errors.

When SSD is used in TDMA allocations, and where there are a single transmitter and multiple receivers, transmitter based propagation delay compensation by itself may not be sufficient since the propagation delay is, in general, different for different receivers. In such cases, using a receiver based propagation delay compensation (where each receiver learns the arrival time with respect to the start of the TDMA interval) would enable minimizing (or eliminating) the extended guard interval.

SSD can also be used in shared allocations where multiple stations can transmit. One example of a shared allocation is a CSMA/CA allocation where stations contend using a backoff algorithm to gain access to the medium. In shared allocations, the receivers do not, in general, have any a priori knowledge of the transmitter. Further, transmissions may be intended for a single receiver or multiple receivers (e.g., broadcast transmissions). In such cases, additional SSD GI may be needed. However, propagation delay based compensation can still be used to reduce the SSD GI. For example, if the propagation delay between any pair of stations in the networks is in the range 1 microsecond to 3 microseconds, the transmitter may compensate for the minimum propagation delay (i.e., 1 microsecond) such that the SSD GI is at least shorter (in this example, only 2 microseconds). Alternatively, the receivers can learn the minimum and maximum latency for PPDUs arriving at its location and sample half way between the minimum and maximum arrival time.

In some implementations, the location of specific transmissions may be known a priori. For example, in some technologies (e.g., HomePlug AV, 802.11), the receiver acknowledges the reception status of a transmission immediately after a transmission. In such cases, propagation delay based compensation can be used to minimize (or eliminate) the need for SSD GI on the acknowledgement. The compensation can be performed either by the transmitter or the receiver or both.

In some implementations, the transmitter can select whether to use a SSD format for the acknowledgements. In such cases, the transmitter can initially select the non-SSD acknowledgement format until the propagation delay can be estimated, after which it can choose the SSD acknowledgements.

Exemplary Propagation Delay Measurement

The propagation delay between a pair of transmitter and receiver can be measured using a variety of techniques. For example, in a system where immediate acknowledgements are used, the transmitter can measure the propagation delay based on the location of the acknowledgement.

Figure 4J:
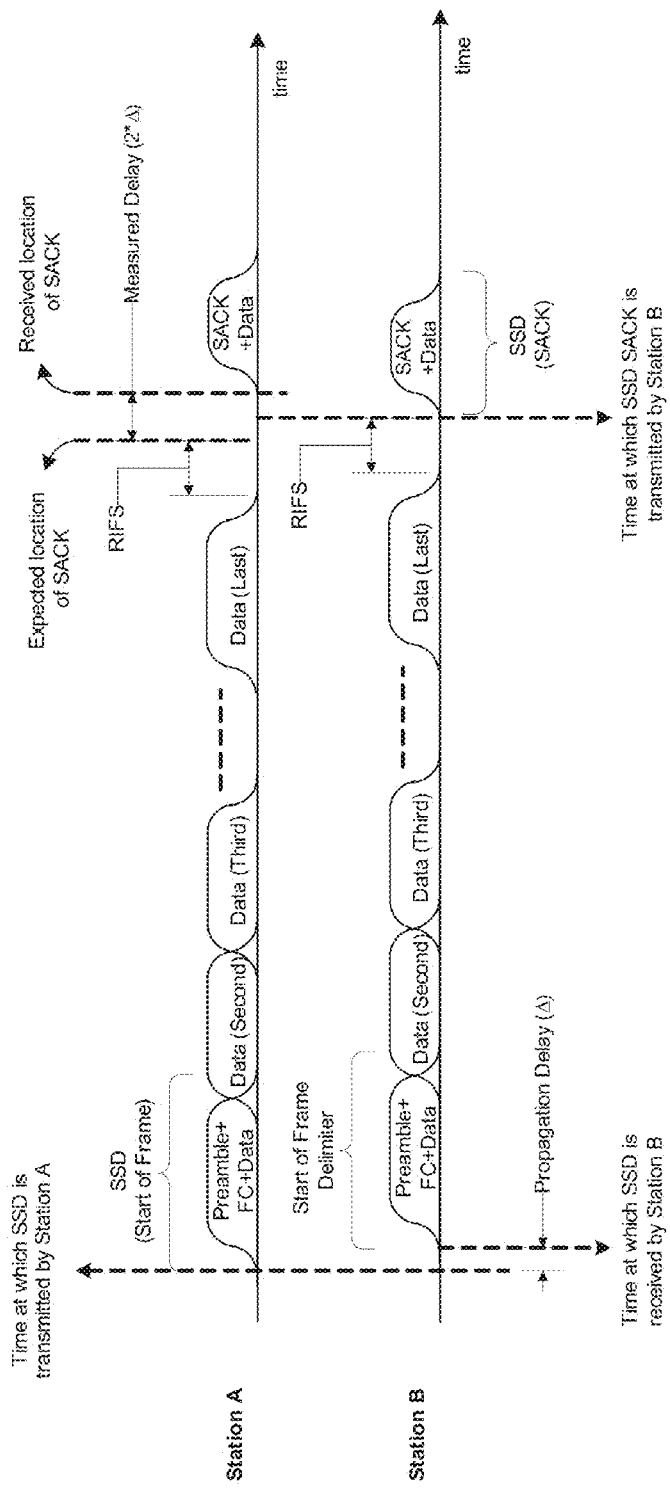

FIG. 4J illustrates an example, where station A (the transmitter) measures the propagation delay to the station B (the receiver) based on the location of the selective acknowledgement (SACK).

Exemplary Propagation Delay Compensation In CSMA/CA Allocation

Figure 4K:
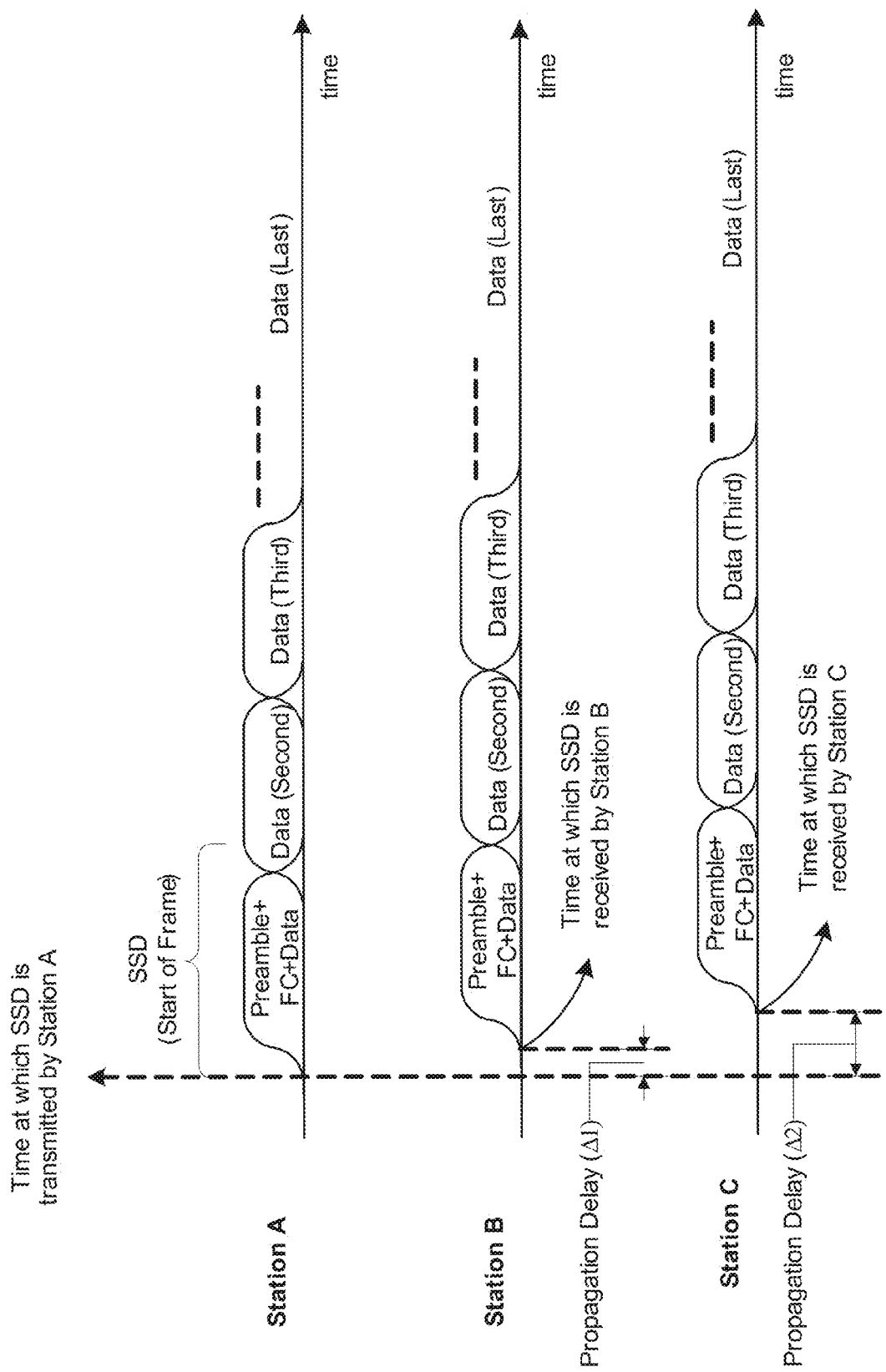

FIG. 4K illustrates an example with a network having three nodes (Station A, Station B and Station C) where no propagation delay compensation is used. In this example, the Guard Interval of the SSD has to be sufficiently large to handle the maximum propagation delay (i.e., $\Delta 2$).

Figure 4L:
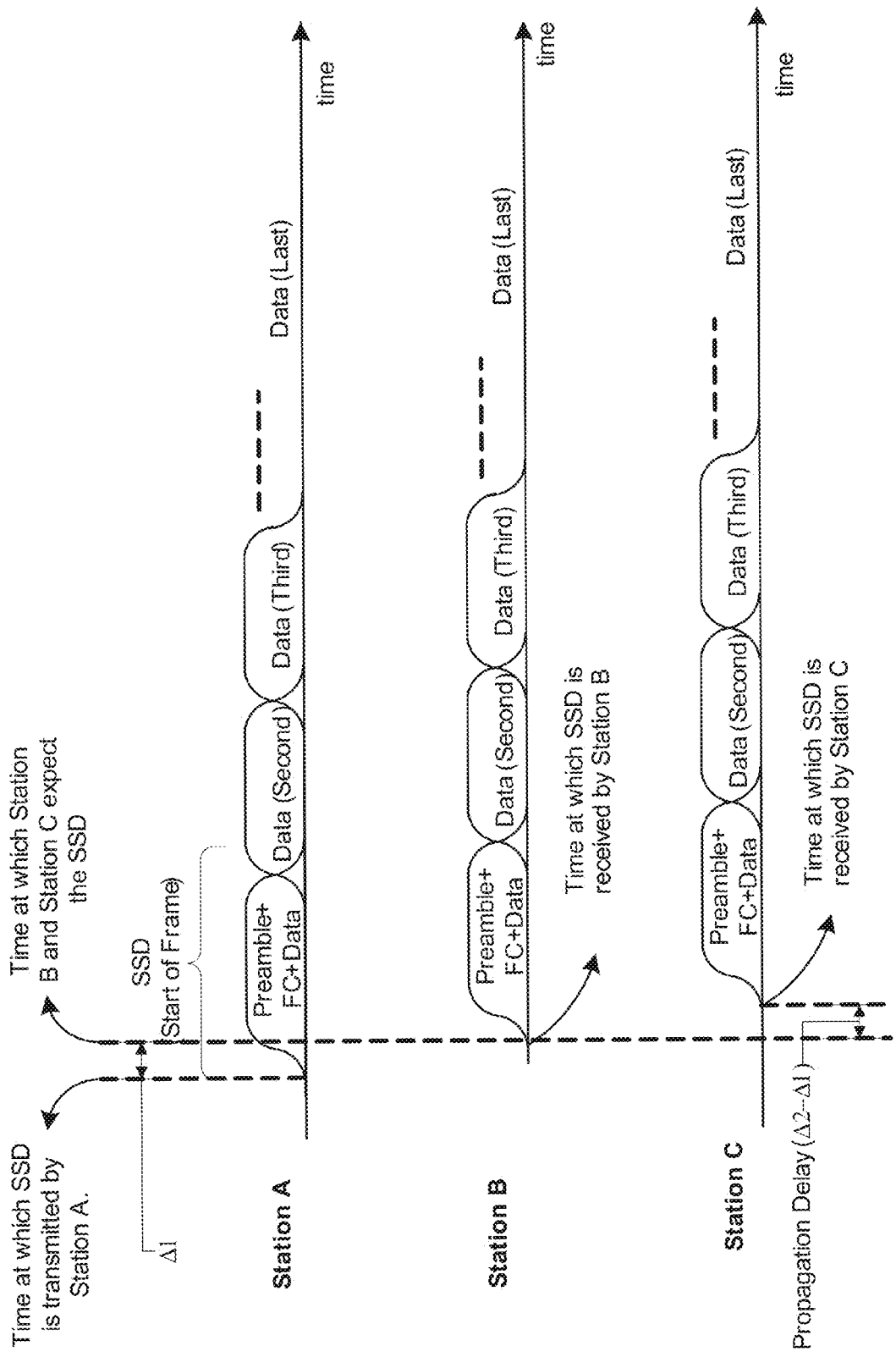

FIG. 4L shows the same network where station A compensated for the propagation delay by transmitting the SSD earlier by $\Delta 1$. In this example, the Guard Interval of the SSD has to be sufficiently large to handle the maximum variation in the propagation delay (i.e., $\Delta 2 - \Delta 1$).

In some implementations, the slot boundaries are established by a single station in the network (e.g., the CCo). The propagation delay from the CCo to other stations can cause variations in the location of the slot boundaries at various stations. Each station in the network may compensate for the slot boundary location to account for the propagation delay between the station and the CCo so that all transmissions start accurately on the slot boundary. If this is not done, the SSD GI might need to extend beyond the maximum propagation delay within the network.

SSD Operation with Legacy Stations (i.e., Stations that do not Support SSD)

Figure 4M:
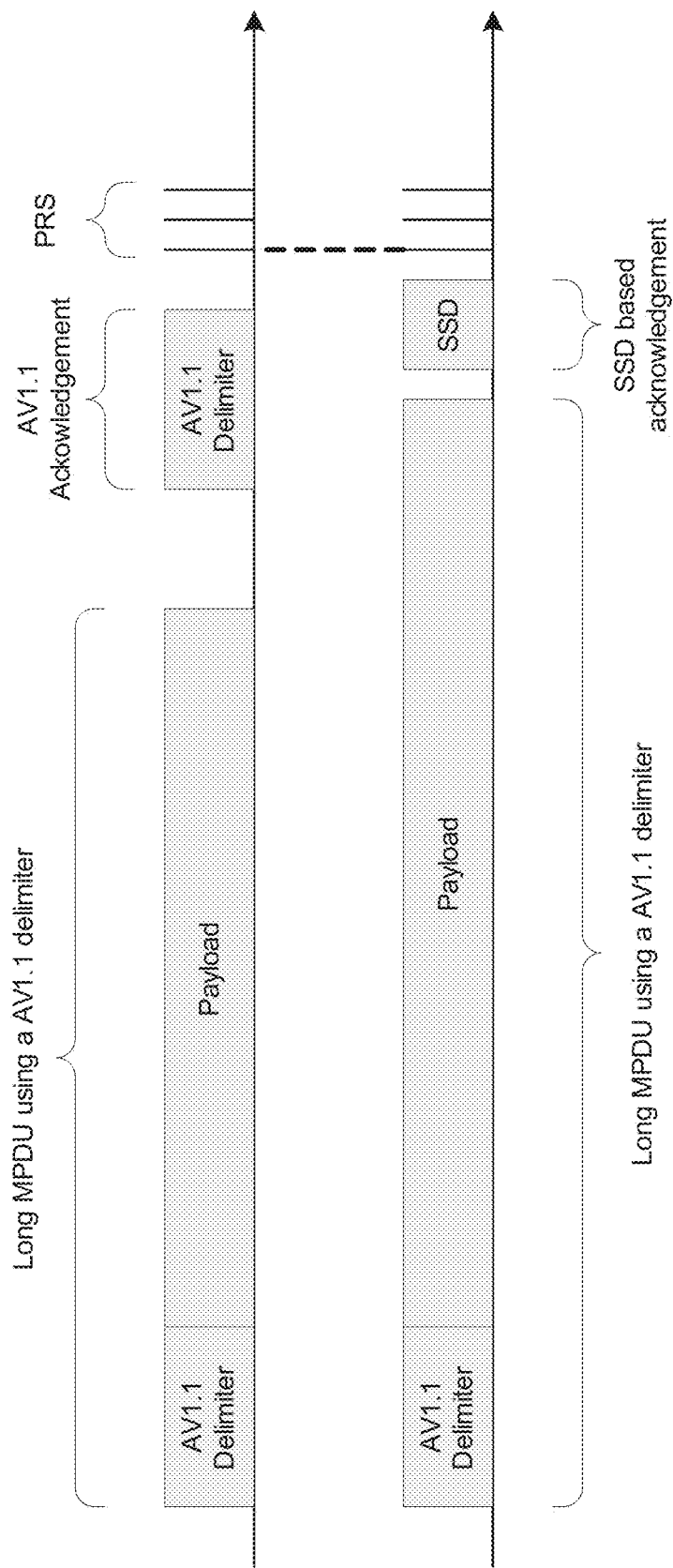

In some implementations, stations supporting SSD may need to share the medium with stations that do not support SSD. For example, SSD may need to be used in a network where legacy stations (e.g., HomePlug AV 1.1 stations) and new stations (e.g., future version of HomePlug AV stations that support SSD such as HomePlug AV 2.0 stations) are within interfering range of one another. In such cases, SSD can be used as follows:

a. During TDMA allocation provided to AV2.0 stations (i.e., AV2.0 transmitter and AV2.0 receiver)
b. During special CSMA allocations that can be used by only AV2.0 stations SSD can also be used for transmitting acknowledgements during allocations that are shared between AV1.1 and AV2.0. For example, SSD acknowledgements can be used during shared CSMA allocation. FIG. 4M illustrates an AV1.0 MPDU sequence and a modified AV1.1 MPDU sequence where the AV1.0 delimiter is used for a long MPDU and SSD is used for an acknowledgement. In this case, the frame length in the AV1.0 delimiter has to be set so that both AV1.1 and AV2.0 stations have the same interpretation of the start of the priority resolution signaling (PRS) slots. In the presence of legacy stations, SSD can be used for any transmission that does not need to be received by the legacy stations.

Figure 12A:
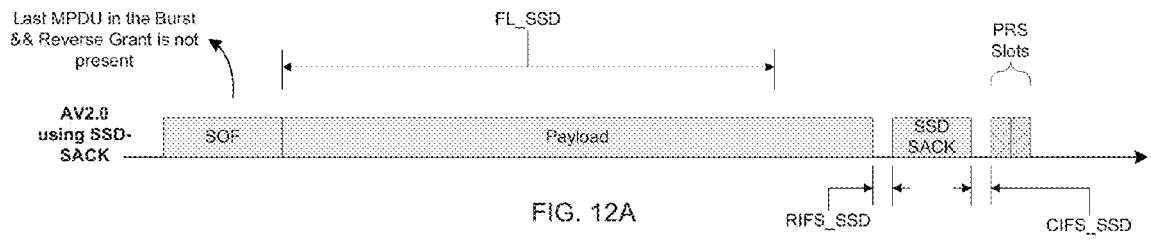
FIGS. 12A, 12B, 13, 14A, and 14B show timing diagrams of examples of setting delimiter fields.
Figure 12B:
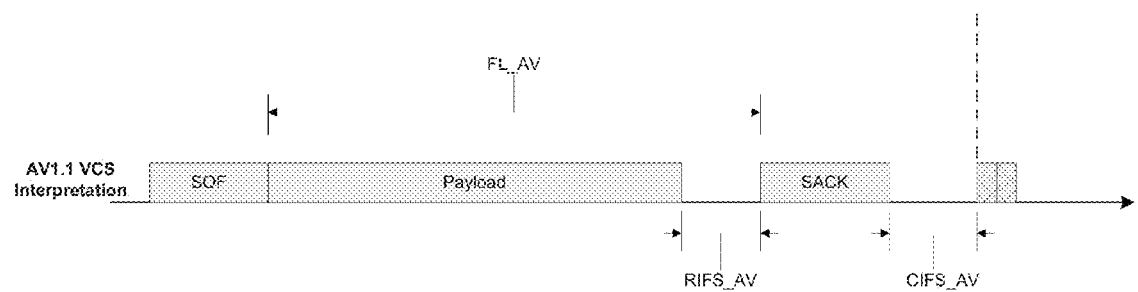

FIGS. 12A and 12B illustrate an example of a method of setting the SOF fields with SSD acknowledgements that enable proper coexistence with the legacy HomePlug AV1.1 stations. FIG. 12A shows the AV2.0 medium activity where a SOF is transmitted followed by payload. The payload is followed by a response interframe space (RIFS_SSD), followed by a SSD SACK and a contention interframe space (CIFS_SSD), respectively. The CIFS_SSD is the gap between the end of the last transmission (e.g., SACK) and the start of the contention (in CSMA) or transmission opportunity (in TDMA). This gap allows for transmitter to receiver turn-around. For example, if a station transmitted a SACK and is expecting to receive another packet, the CIFS_SSD will allow the station to configure its hardware to go into a receive state from transmit state. The end of CIFS_SSD is followed by Priority Resolution Symbol (PRS) slots. To enable compatibility with legacy AV1.1, the SOF is transmitted using AV1.1 format. Further the setting of the fields in the SOF is done in a manner that will enable the legacy devices to properly set the virtual carrier sense (VCS) which enables such devices to properly determine that start of the next PRS slot. In this example, an AV2 station indicates in the SOF that the current MPDU is the last MPDU in the burst and that no reverse grant is provided to the receiver. This indicates to the legacy AV1.1 stations that PRS slots will start after the current transmission is complete. An AV2.0 station further indicates the frame length (FL_SSD) of the transmission as shown in FIG. 12A. In particular, an AV2.0 sets the frame length such that legacy stations know when the PRS slots start. FIG. 12B shows the medium activity as interpreted by legacy AV1.1 stations. Because a AV2.0 receiver is aware of the presence of a SSD SACK (for example, additional field in the SOF can be used to indicate the presence of a SSD SACK), they can determine the duration of payload as:, $$AV2.0 \text{ Payload duration} = FL\_SSD + (AV1.1 \text{ SACK duration} + AV1.1 \text{ CIFS\_AV duration}) - (RIFS\_SDD + SSD \text{ SACK duration} + CIFS\_SSD).$$

Figure 13:
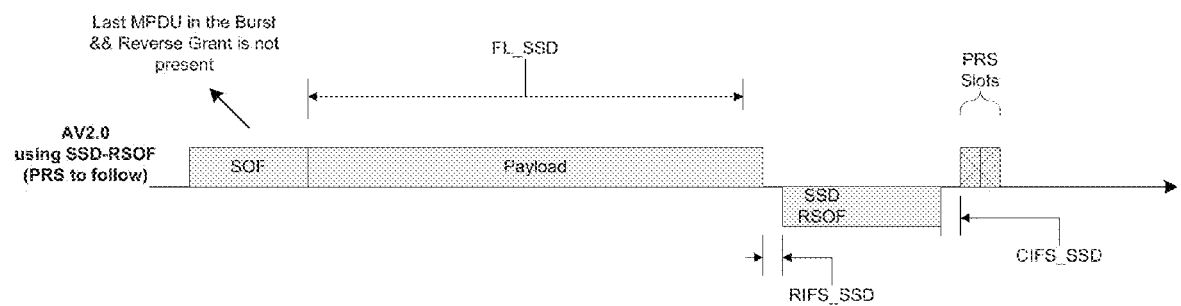

In some implementations, SSD delimiters can also be used for transmission of a Reverse Start of Frame (RSOF) in the presence of legacy AV1.1 stations. FIG. 13 shows an example of a method of setting the SOF fields with SSD RSOF that enables proper coexistence with the legacy HomePlug AV1.1 stations. FIG. 13 shows AV2.0 medium activity where a SOF is transmitted followed by payload. The payload is followed by a response interframe space (RIFS_SSD), followed by a SSD RSOF and its payload. The SSD RSOF payload is followed by CIFS_SSD. The CIFS_SSD is followed by the PRS slots. The presence of RSOF and the duration of RSOF payload are indicated using fields in the SOF that do not substantially affect the behavior of legacy stations.

In the example shown in FIG. 13, the SOF is transmitted using AV1.1 format to enable compatibility with the legacy AV1.1 systems. Further the setting of the fields in the SOF is done in a manner that enables the legacy devices to properly set the virtual carrier sense (VCS) which in turn enables them to properly determine the start of the next PRS slot. In this example, the AV2 station indicates in the SOF that the current MPDU is the last MPDU in the burst and that no reverse grant is provided to the receiver. This indicates to the legacy AV1.1 stations that the PRS slots will start after the current transmission is complete. The AV2.0 station further indicates the frame length (FL_SSD) of the transmission as shown in FIG. 13. In particular, the AV2.0 station sets the frame length such that the legacy stations know the exact start of the PRS slots. The interpretation of the transmitted signal by a legacy AV1.1 station is substantially the same as described above with reference to FIG. 12B. In this case, because the AV2.0 receiver is aware of the presence of a SSD RSOF and the RSOF payload, the duration of SOF payload is determined as:

$$AV2.0 \text{ SOF Payload duration} = FL\_SSD + (AV1.1 \text{ SACK duration} + AV1.1 \text{ CIFS\_AV duration}) - (RIFS\_SDD + SSD \text{ RSOF duration} + RSOF \text{ Payload duration} + CIFS\_SSD).$$

Figures 14A, 14B:
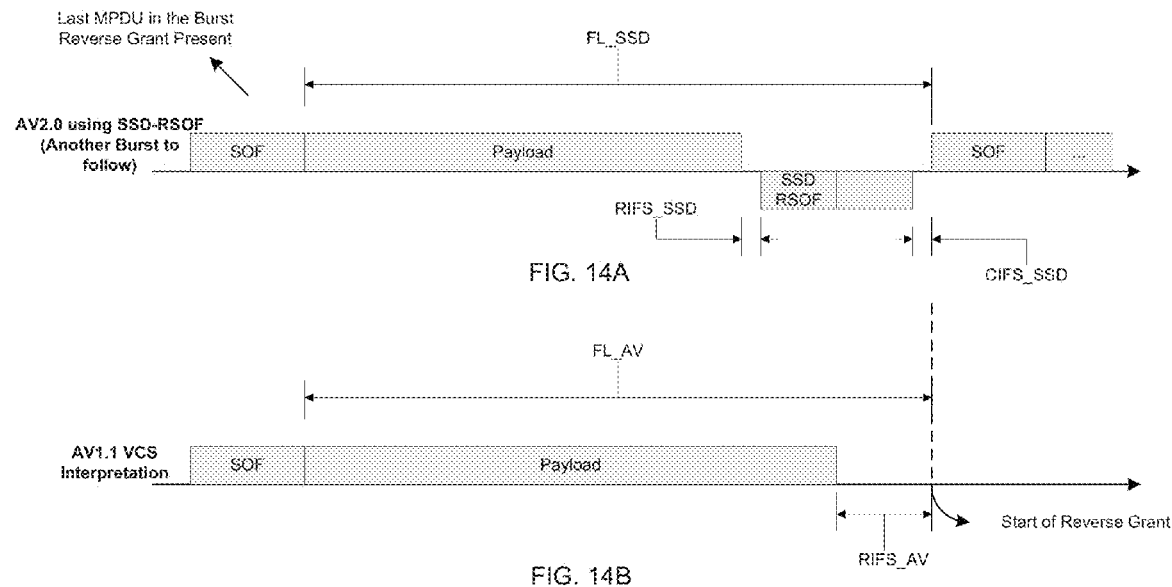

In some implementations, the AV2.0 stations may want to continue transmitting after transmission of the SSD RSOF payload ends. FIGS. 14A and 14B show an example of a method of setting the SOF fields to ensure that legacy HomePlug AV1.1 stations continue to defer from accessing the medium after the end of transmission of the SSD RSOF payload. FIG. 14A shows AV2.0 medium activity where a SOF is transmitted followed by a payload. The payload is followed by a response interframe space (RIFS_SSD), followed by a SSD RSOF and a SSD_RSOF payload. The SSD RSOF payload is followed by CIFS_SSD. At the end of CIFS_SSD, the station that transmits the first SOF can retain control of the medium and send another MPDU. In this example, the station sends a second SOF. The presence of the RSOF and the duration of RSOF payload are indicated using fields in the SOF that do not substantially affect the behavior of the legacy stations.

In the example shown in FIGS. 14A and 14B, the SOF is transmitted using AV1.1 format to enable compatibility with legacy AV1.1. Further the setting of the fields in the SOF is done in a manner that enables the legacy devices to properly set the VCS which in turn enables the legacy devices to properly defer from accessing the medium after the end of SSD RSOF payload. In this example, the AV2 station indicates in the SOF that the current MPDU is the last MPDU in the burst and that a reverse grant is provided to the receiver. This indicates to the legacy AV1.1 stations that another transmission will start after the current transmission is complete, thus causing them to defer from accessing the medium. AV2.0 station further indicates the frame length (FL_SSD) of the transmission as shown in FIG. 14A. In particular, the frame length is set such that the legacy stations know when the next transmission starts. FIG. 14B shows the medium activity as interpreted by legacy AV1.1 stations. Because an AV2.0 receiver is aware of the presence of a SSD RSOF and the RSOF payload, the duration of the SOF payload can be determined as:

$$AV2.0 \text{ SOF Payload duration} = FL\_SSD - (RIFS\_SDD + SSD \text{ RSOF duration} + RSOF \text{ Payload duration} + CIFS\_SSD)$$

Variation of Transmit Power

In some implementations, the transmit power level on some of the carriers of the SSD may be adjusted to increase detection reliability. For example, the preamble carriers may be boosted by 2 dB compared to the other carriers in the SSD (or compared to the power level of the carriers of the following OFDM symbols) to help provide better preamble detection performance and channel estimation (coherent reference). The power boost may be applied to the preamble, frame control or possibly all carriers, and may be applied in different amount such as higher for preamble carriers, medium for frame control, and a small amount for payload carriers. Since the SSD is relatively short, some or all of the carriers may be boosted by a small amount (e.g. 2-3 dB) without the radiation level increasing significantly because of the characteristics of the RF detector used in regulatory compliance.

SSD and Repeating

SSD can be used in communication systems that use repeaters. Since repeating involves multiple retransmissions before the data is delivered to the intended destination(s), the SSD provides improvement in performance by reducing the overhead for each repetition.

Figure 10:
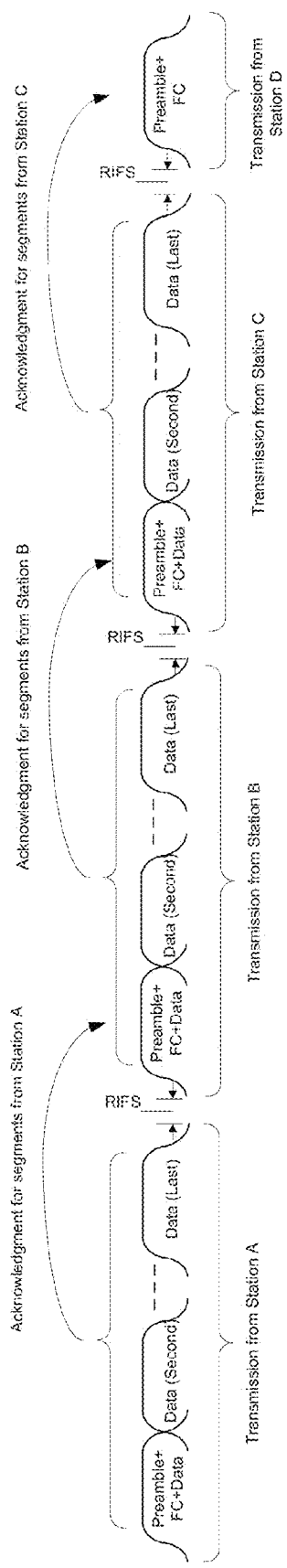
FIG. 10 depicts a timing diagrams related to a scheme including repeated transmissions.

FIG. 10 shows an example scheme of using the SSD for repeating. In this example, data from Station A is repeated by stations B and C before it reaches the destination station D. The SSD transmitted by station B contains acknowledgment information for the prior transmission from Station A. Similarly, the SSD transmitted by station C contains acknowledgment information for the prior transmission from Station B. The acknowledgement information for the transmission from station C is indicated using a SSD transmitted from station D. This example illustrates the reduction in overhead that can be obtained by using SSD. This approach can be further enhanced by using delayed acknowledgements to reduce and/or eliminate the overhead due to RIFS (e.g., as described below with reference to FIGS. 15A, 15B and 16-17).

The scheme shown in FIG. 10 can be used in CSMA and TDMA allocations. In CSMA allocations, Station A can pass control of the medium to Station B after a transmission. Similarly, Station B can pass control to Station C and Station C can pass control to Station D. This approach can reduce the overhead for channel access as stations B, C and D do not incur any channel access overhead (i.e., they do not need to contend for medium access). The indication of acknowledgement information by stations B, C and D for transmissions received from stations A, B and C, respectively, enables the stations to retransmit undelivered payload in future transmissions. In this approach, the intermediate stations (i.e., stations B and C) may need to store payload data that is not successfully delivered and retransmit as a part of a future transmission. In some implementations, if the intermediate stations cannot store or retransmit undelivered packets (for example, due to insufficient memory), the approach illustrated by FIGS. 15A and 15B can be used.

Figure 15A:
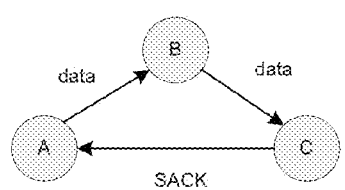
FIG. 15A is a schematic diagram of an exemplary sequence of transmissions by stations using at least one repeater.
Figure 15B:
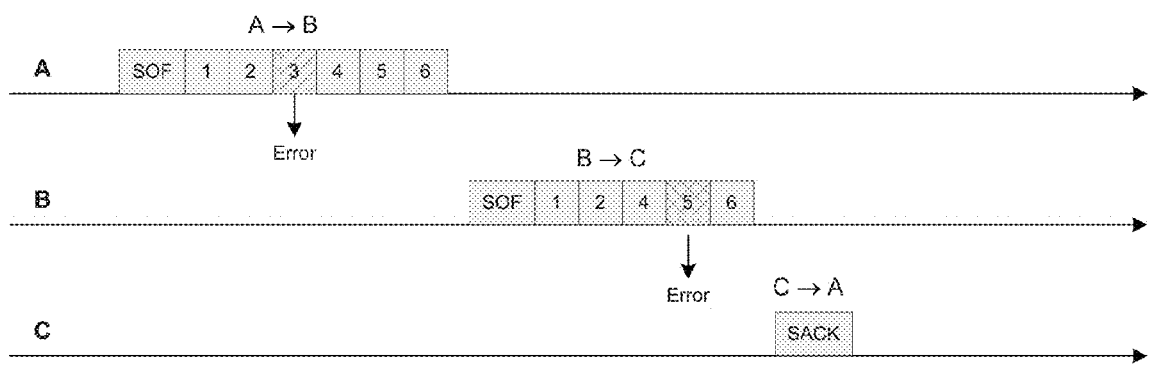
FIGS. 15B, 16, and 17 show timing diagrams related to schemes including repeated transmissions and delayed acknowledgements.

FIG. 15A shows an example where Station A transmits data to Station C using Station B as a repeater. In other words, Station A sends data to Station B and Station B sends received data to Station C. In this example, Station C directly sends selective acknowledgements (SACK) to Station A. FIG. 15B shows that a transmission from Station A to Station B contains payload units {1, 2, 3, 4, 5, 6}. This example assumes that during the transmission from Station A to Station B, the payload unit 3 is corrupted. The example further assumes that Station B retransmits the payload units {1, 2, 4, 5, 6} of which payload unit 5 is corrupted. The SACK from C to A therefore indicates that the payload units {1, 2, 4, 6} were properly received. This causes A to retransmit the payload units {3, 5}. A variety of approaches can be used to communicate to Station A information on the payload units that are properly received at Station C. In some implementations, each of the payload units can have an identifying sequence number. In such implementations, Station C can indicate the sequence numbers of the payload units that are properly received. In some implementations, the relative location of the payload unit within the MPDU can be used for acknowledgements. In such cases, Station C can use a bit map to indicate whether each of the payload units {1, 2, 3, 4, 5, 6} was received properly at Station C. In this approach, Station B can notify Station C the payload units that are received with errors. This information can be included, for example, in the SOF of the MPDU transmitted from Station B. Station C can use that information and determine the exact bit map to indicate to Station A. In this example, Station C's SACK bit map is {G,G,B,G,B,G}, where G (Good) indicates that payload unit was properly received and B (Bad) indicates that payload unit was received with errors.

In the above example, Station C sends SACK directly to Station A. This is possible only when Station C can directly communicate to Station A, and Station B is used for achieving a higher data rate between stations A and C. Because SACK information is relatively smaller as compared to the data, direct transmission of SACK from Station C to Station A can be more efficient in some cases. In some implementations, Station C can send the SACK information to Station B (or any other suitable station), which then retransmits the SACK information to Station A. This approach can be used when Station C cannot directly communicate with Station A. Generally, the sequence of stations used to repeat data over a shared medium from an origin station to a destination station may have a higher throughput than the throughput of the sequence of stations used to repeat the SACK from the destination station to the origin station, but it may still be advantageous to transmit the SACK with fewer repetitions due to the overhead of processing at each repeater compared to the size of the SACK.

Figure 16:
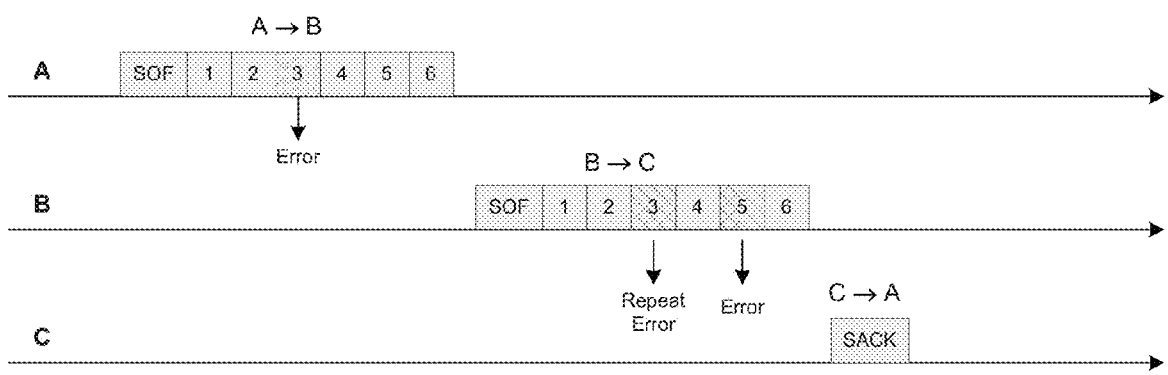

FIG. 16 shows another example scheme of repeating. In this example, Station B receives payload unit 3 with errors and retransmits the erroneous payload unit along with the properly received payload units to Station C. Station C receives payload units {3, 5} with errors. The repetition of erroneous payload units by Station B enables Station B to maintain the same relative ordering of payload units as Station A. This in turn enables Station C to generate a SACK that uses an identifier such as a bit map to indicate which payload in the MPDU is properly received. In this example, Station C can transmit a SACK with the bit map {G,G,B,G,B,G}.

HomePlug AV is an example of a system that uses SACK with bit map that indicates the reception status of payload units relative to the MPDU (e.g., first bit in the bit map indicates the reception status of first payload unit in the MPDU). In some implementations, the approach described in FIG. 16 can be used for repeated transmissions in systems based on HomePlug AV. The approach described above can also be combined with MPDU bursting. In some implementations, all the payload units in an MPDU burst can be treated as being sequential for indicating SACK. For example, if Station A sends two MPDUs in a burst to Station B with the first MPDU in the burst containing payload units {1, 2, 3, 4} and the second MPDU in the burst contain {5, 6}, Station B may retransmit all the payload units received in a single MPDU to station C. The SACK information from Station C can include a bitmap where the first bit indicates the reception status of the first payload unit in the burst, and so on. The bit mapped SACK format where the payload unit ordering is based on relative location within the burst can remove dependency of the SACK information on the burst characteristic (i.e., number of MPDUs in the burst and number of payload units per burst) which can change with each transmission.

Figure 17:
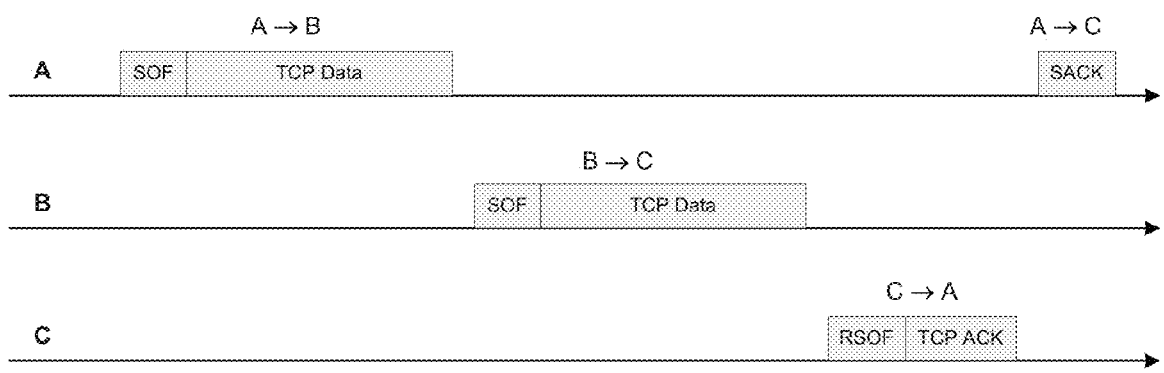

Transmission Control Protocol (TCP) is a widely used transport layer protocol. TCP uses TCP acknowledgements to ensure that the data is properly received at the destination. TCP acknowledgements are generally small compared to the TCP data. FIG. 17 shows an approach for repeated transmissions when TCP is used. In this example, Station A sends TCP data to Station B. Station B repeats the TCP data to Station C. Station C transmits a RSOF with TCP ACKs to Station A. The RSOF includes selective acknowledgement information that indicates the reception status of payload units that are transmitted from Station A. After receiving a transmission from Station C, Station A sends a SACK to indicate the reception status of TCP ACKs. In this example, it is assumed that Station C can directly transmit to Station A. In scenarios where this is not possible, Station B (or any other suitable station) can be used as a repeater to transmit the RSOF and TCP ACKs from Station C to Station A. In some implementations, Station A may not send an immediate SACK for the TCP ACK. In such cases, Station A can combine the acknowledgement information for the TCP ACK in a subsequent SOF transmission.

Repeated transmissions can use SSD or another format for transmitting the delimiters. For example, SOF can be transmitted using HomePlug AV1.1 format, while RSOF and SACK are transmitted using SSD format. The repeating approach can be used in TDMA or CSMA allocations.

SSD and Automatic Gain Control

Automatic Gain Control (AGC) for receiving the SSD from a transmitter can take into account the AGC setting used for prior transmissions from that transmitter. This approach can be used whenever the receiver has precise knowledge of the station from which it is expecting to receive a transmission. For example, the AGC can be used in TDMA allocation, for receiving SACKs, etc.

In some implementation, the receiver may preset the AGC to a predetermined value for a specific transmitter.

ILLUSTRATIVE EXAMPLES

This section describes illustrative examples of low-overhead delimiters. The examples described in this section illustrate particular implementations and should not be construed as limiting the scope of the invention as defined by the claims. The examples describe a delimiter that includes one OFDM symbol and carries pilot information (sometimes referred to as preamble information), frame control (FC) information (sometimes referred to as header information), and optionally data from the first payload PHY block (PB) (sometimes referred to as payload segment). The information was modulated on respective carriers (sometimes referred to as tones) spaced at integral multiples of a carrier spacing related to the inverse symbol length. In this delimiter, pilot carriers allowed for frame detection and synchronization, and were also used for the construction of the coherent reference for FC decoding. Carriers reserved for frame control carried control information that was used by the receiver to process the received frame. In some cases, frame control carriers along with pilot carriers were also used to obtain a more accurate coherent reference for decoding the payload.

Delimiter Encoding

Delimiter encoding in this example used pilot carriers, frame control carriers, and optionally data carriers. Depending on the signal-to-noise ratio (SNR) of the path through the transmission medium from the transmitter to receiver (the "channel"), different signaling schemes were utilized. The default scheme reserved ¼th of the carriers as pilot and ¾th of the carriers as FC carriers. For a clean channel having a high SNR, ¼th of the carriers were used for Pilot, ¼th of the carriers were used for Frame Control and the remaining half were used to send data. These two configurations are shown in tables 4 and 5, where the first row gives the carrier number, and the second row provides the carrier assignments. X denotes carriers masked by an Encoding 1 tone mask, and P, F, and D represent pilot, frame control and data, respectively. The Encoding 1 tone mask refers to a hard coded mask created for each country or region to meet local emission regulations. An Encoding 2 tone mask is media and network specific, that enables users to turn on tones masked by Encoding 1 to provide further redundancy. As described in below, in some cases, tones enabled by Encoding 2 were used as pilot and frame control carriers for encoding redundant information for a robust encoding mode in such way that receivers using the Encoding 1 tone mask were able to fully detect and decode the delimiter. Data that was not redundantly encoded were not encoded on tones enabled by the Encoding 2 tone mask in consideration for the receivers utilizing the Encoding 1 tone mask alone.

TABLE 4

Configuration #1 - pilot and FC - Encoding 2 not used

| 0 | ... | 74 | 75 | 76 | ... | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|---|---|---|---|
| Out of band | | X | X | X | | F | P | F | F | F | P | X | X | X | X | X | F | F | P | F | F |

TABLE 5

Configuration #2 - pilot, FC, and data - Encoding 2 not used

| 0 | ... | 74 | 75 | 76 | ... | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|---|---|---|---|
| Out of band | | X | X | X | | D | P | D | F | D | P | X | X | X | X | X | F | D | P | D | F |

In some cases, the carriers 93 to 97 were enabled by Encoding 2. The corresponding carrier assignments that were used are shown in tables 6 and 7.

TABLE 6

Configuration #1 - pilot and FC - Encoding 2 enabled

| 0 | ... | 74 | 75 | 76 | ... | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|---|---|---|---|
| Out of band | | X | X | X | | F | P | F | F | F | P | <u>F</u> | <u>F</u> | <u>F</u> | <u>P</u> | <u>F</u> | F | F | P | F | F |

TABLE 7

Configuration #2 - pilot, FC, and data - Encoding 2 enabled

| 0 | ... | 74 | 75 | 76 | ... | 87 | 88 | 89 | 90 | 91 | 92 | 93 | 94 | 95 | 96 | 97 | 98 | 99 | 100 | 101 | 102 |
|---|---|---|---|---|---|---|---|---|---|---|---|---|---|---|---|---|---|---|---|---|---|
| Out of band | | X | X | X | | D | P | D | F | D | P | X | <u>F</u> | X | <u>P</u> | X | F | D | P | D | F |

Pilot

In the delimiter illustrated in Table 4, every fourth tone was reserved as a pilot. Pilot tones were modulated according to a phase reference table (described later) which was obtained from a linear chirp signal spanning carriers from 0 to 50 MHz ("Channel 1"). The same phase reference table was used for carriers from 50 to 100 MHz ("Channel 2"). In some cases, the phase reference table included integer multiples of $\pi/4$.

Encoding on Channel 1 or Channel 2

From the phase reference table, every fourth tone was used for the pilot and from those tones, only the ones that were unmasked in the tone mask's Encoding 1 and Encoding 2, were modulated for that purpose. The pilot modulation used is shown in Equation 3, where, QAMScale was taken to be 836 and the power was boosted by 0.8 dB above of that of the payload.

$$\text{Pilot}FFT(\text{PilotTones}) = QAMScale \times PhaseRef(\text{PilotTones}) \times IFFTScale \times 10^{0.8/20} \quad (\text{Eq. 3})$$

This transmitted pilot was also kept as a reference for the receiver after it was phase corrected for the cyclic prefix (CP) offset (CP_Offset) used by the delimiter as follows:

$$TxPilotFreqRef(\text{PilotTones}) = \text{PilotFFT}(\text{PilotTones}) \times \exp\left(-\frac{j \times 2\pi \times CP\_Offset \times \text{Pilot Tone Indices}}{FFTLength}\right) \quad (\text{Eq. 4})$$

where, FFTLength was 4096. The CP_Offset is described later. Because the pilot, frame control and payload portions of the delimiter were combined before the IFFT operation, scaling and phase reference were applied only once at the end.

Encoding on Channel 3

For Channel 3, the tone masks from the upper and lower channels (channel 1 and channel 2, respectively) were combined, however, the pilot tones were modulated the same way using the same phase reference table on upper and lower bands. The FFTLength in Eq. 4 was changed to 8192 and the pilot tone indices were changed accordingly.

Frame Control (FC)

Depending on the delimiter configuration, either ¾th or ¼th of the tones were encoded as FC carriers. Frame control field included 128 information bits. Encoding was performed in a module as shown in FIG. 3, optionally with additional step(s) for increased redundancy. After encoding, the FC sub-carriers were scaled and phase rotated according to the phase reference table mentioned. This is shown in Eq. 5:

$$FrameControlFFT(FCTones) = FCQAMScale \times (FC_I + jFC_Q) \times PhaseRef(FC\ Tones) \times IFFTScale \times 10^{0.8/20} \quad (\text{Eq. 5})$$

Similar to Pilot generation, IFFT and power scaling and phase reference were applied only at the end.

Encoding on Channel 1 or Channel 2

FC was encoded based on available tones in the tone mask's Encoding 1. In some cases, tone mask's Encoding 2 was also used to provide further diversity copying. This was done by starting a new diversity copier table of length equal to the number of available tones in Encoding 2 and by starting the first row for I and Q from where the table for Encoding 1 set ended. This is shown in tables 8 and 9. In this implementation, Encoding 2 was not required for proper decoding, but improved the performance if made available.

TABLE 8

Diversity Copier Table for Encoding 1

| Enc1 Used Carrier # | I-Channel Interleaved Bit Address | Q-Channel Interleaved Bit Address |
|---|---|---|
| 0 | 0 | 128 |
| 1 | 1 | 129 |
| 2 | 2 | 130 |
| ... | ... | ... |
| c | c mod 256 | (c + 128) mod 256 |
| ... | ... | ... |
| Enc 1 NumCarriers-1 | (Enc 1 NumCarriers-1) mod 256 | ((Enc 1 NumCarriers-1) + 128) mod 256 |

TABLE 9

Diversity Copier Table for Encoding 2

| Enc2 Used Carrier # | I-Channel Interleaved Bit Address | Q-Channel Interleaved Bit Address |
|---|---|---|
| 0 | (Enc 1 NumCarriers) mod 256 | ((Enc 1 NumCarriers) + 128) mod 256 |
| ... | ... | ... |
| Enc 2 NumCarriers-1 | (Enc 1 + Enc 2 NumCarriers-1) mod 256 | ((Enc 1 + Enc 2 NumCarriers-1) + 128) mod 256 |

Encoding on Channel 3

For Channel 3, the tone masks from Channels 1 and 2 were combined. Their respective Encoding 1 masks remained the same as before they were merged. The new Encoding 2 masks were, in general, different. Because a receiver should be able to detect the frame control of a transmitter that's using Channel 3 by only looking at Channel 1, the encoding on Channel 1 part of Channel 3 remained as described above. Channel 2, on the other hand, was started from where Channel 1 finished in Encoding 1. In other words, Channel 2 was encoded using the same diversity copying approach described earlier, except that its first row for Encoding 1 was similar to that of Channel 1's Encoding 2 as shown below. The Encoding 2 table also followed the same procedure described in above and shown in Table 11.

TABLE 10

Diveristy Copier Table for Upper Band of Channel 3, Encoding 1

| Enc 1 Used Carrier # | I-Channel Interleaved Bit Address | Q-Channel Interleaved Bit Address |
|---|---|---|
| 0 | (Ch 1, Enc 1 NumCarriers) mod 256 | ((Ch 1, Enc 1 NumCarriers) + 128) mod 256 |
| ... | ... | ... |
| Ch2, Enc 1 NumCarriers-1 | (Ch1, Enc 1 + Ch2, Enc 1 NumCarriers-1) mod 256 | ((Ch1, Enc 1 + Ch2, Enc 1 NumCarriers-1) + 128) mod 256 |

TABLE 11

Diversity Copier Table for Upper Band of Channel 3, Encoding 2

| Enc 1 Used Carrier # | I-Channel Interleaved Bit Address | Q-Channel Interleaved Bit Address |
|---|---|---|
| 0 | (Ch1, Enc 1 + Ch2, Enc 1 NumCarriers) mod 256 | ((Ch 1, Enc 1 + Ch2 Enc1 NumCarriers) + 128) mod 256 |
| ... | ... | ... |
| Ch2, Enc 2 NumCarriers-1 | (Ch1, Enc 1 + Ch2, Enc 1 + Ch2, Enc 2 NumCarriers-1) mod 256 | ((Ch1, Enc 1 + Ch2, Enc 1 + Ch2, Enc 2 NumCarriers-1) + 128) mod 256 |

Data

In channels with high SNRs, payload encoding began in the delimiter with half of the tones (every other tone) in the band being reserved for data as shown in Table 5. Tones that were enabled in Encoding 1 tone mask were the data carrying tones. Encoding 2 was not used for data.

For encoding the data carriers, a tone map was used to determine the modulation on the data carrying tones. Following channel interleaving operations, the interleaved bits for each data block were assigned to each symbol starting from the delimiter. This assignment was made prior to the delimiter symbol generation. Bits assigned to each symbol were mapped to the appropriate data carriers according to the tone map. In some cases, the mapping was performed separately for the delimiter and the payload.

Information bits were encoded and modulated on subsequent symbols. Encoding data on Channel 1 or 2 was similar to that of Channel 3, except that in Channel 3 the upper and lower bands were combined, resulting in a larger number of tones.

Delimiter Symbol Generation

Once the modulation on all carriers in the frequency domain was known, they are multiplied by the phase reference as shown in Eq. 6. Following the IFFT operation and subsequent scaling adjustment, the delimiter power was boosted by 0.8 dB over the payload symbol(s). Next, a fixed number of samples from the end of the time samples were taken and inserted as a cyclic prefix at the front of the IFFT interval to create an extended OFDM Symbol (e.g., as shown in FIG. 4). The delimiter's cyclic prefix included a rolloff interval (RI) and a guard interval (GI). The GI length was chosen to accommodate the uncertainty in the announced start location. In other words, given RI=4.96 μs and GI=6.96 μs, if the frame arrives within +/−1 μs of the start-search symbol boundary, the receiver can still process the entire (un-overlapped) delimiter in its FFT. This is done by processing the received waveform at PacketStartLocation+RI+(GI−RI)/2, giving a CP Offset of (GI+RI)/2.

$$\text{TimeDomain} = IFFT(\text{Freq}(\text{Pilot}, FC, \text{Data})) \times \text{Phase} Ref) \times IFFT\text{Scale} \times 10^{0.8/20} \quad \text{(Eq. 6)}$$

In this example, a real 4096-point IFFT was used for transmitting on Channels 1 or 2, and a real 8192-point IFFT was used in case of Channel 3 with the combined tones. Also, the same phase reference was used for the upper and lower band portions of Channel 3.

Delimiter Detection and Decoding

The receiver determined an estimate of the frame arrival time in order to successfully detect and process the frame. The Delimiter's cyclic prefix allowed for a certain amount of flexibility with respect to the accuracy of the expected start location (e.g., within a tolerance that depended on the GI length). After samples of the delimiter were acquired, delimiter detection (i.e. confirming the presence of the delimiter using the pilot tones and determining its start location) and FC decoding processes in the receiver were performed simultaneously. Once a coherent reference for the payload was determined, the data portion of the delimiter (if available) was decoded.

Detection

In order for the receiver to process the entire (un-overlapped) delimiter in its FFT, the receiver processed the received waveform at PacketStartLocation+RI+(GI−RI)/2; where, PacketStartLocation was the expected start position, RI was the overlap size, and GI was the guard interval length. To detect the delimiter on Channels 1 and 2, the receiver used a same algorithm, while for Channel 3, larger sizes of FFT and IFFT were used (because Channel 3 had more carriers).

Detecting on Channel 1 or Channel 2

Pilot tones were only present in ¼th of all used carriers. The delimiter was detected by using the tone mask's Encoding 1 alone. However, where Encoding 2 was also available, the receiver's performance was further improved by using the combined set of tones in Encoding 1 and 2. In addition to this, in some cases, the knowledge of an amplitude map was used to mask the received pilot tones which had an amplitude of zero as per the amplitude map, hence avoiding the particular pilot tones in the detector.

Figure 5A:
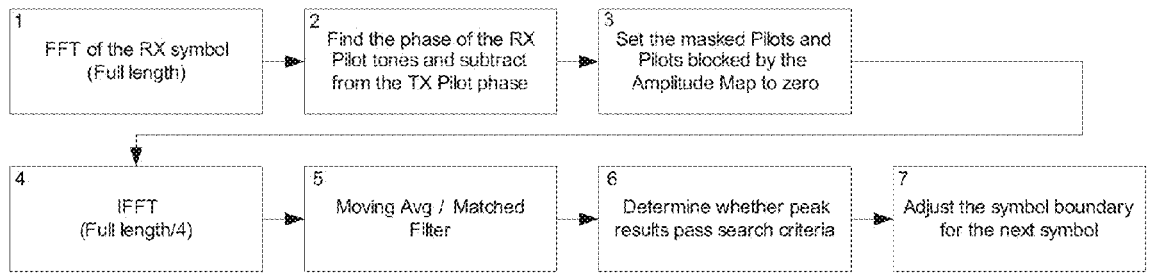
FIGS. 5A-5E are flowcharts for procedures for processing a delimiter symbol.

The detection was carried out as shown in the flowchart of FIG. 5A. The first step after the 4096-point FFT was to remove the phase rotation imposed by the channel on the pilot tones by dividing the received pilot phases by the transmitted phases from Eq. 4 (because the transmitted phases were known by both the transmitter and receiver). Next, the normalized channel impulse response was obtained by getting the IFFT of the outcome. This is represented by equation 7. Because pilot tones were present only on every fourth carrier, the size of the real IFFT used was 1024.

$$\text{Norm\_resp} = IFFT(\text{UsedMask} \times \exp(j(\phi_{RX}(k_p) - \phi_{TX}(k_p))))/(FFTSIZE/4/\text{NumUsedTones}) \quad \text{(Eq. 7)}$$

$$\text{UsedMask} = (\text{Encoding1 Pilots} + \text{Encoding2 Pilots}) \times (\text{Amplitude Map (Pilots)} \neq 0) \quad \text{(Eq. 8)}$$

where, $k_p$ was the carrier number of the pilot tones for a total of FFTSIZE/4=1024 carriers, $\Phi_{RX}$ was the phase angle of received pilot tones, $\Phi_{TX}$ was the phase of transmitted pilot tone (from Eq. 4). Also, UsedMask was of length FFTSIZE/4. To obtain a better estimate of the impulse peak, a moving average window or a matched filter was used to help reduce noise and collect the peak energy spread by the channel. In the moving average approach, the detector used a sliding rectangular window (Win[ ]) of width of M samples (e.g. M=21). First, the location of the peak was obtained by:

$$\text{PeakIdx} = \text{PeakSearch}(|\text{Norm\_resp}[n]|) \quad \text{(Eq. 9)}$$

where n ranged from 0 to (FFTSIZE/2−1)

In the equation above, PeakIdx is the number of samples from the actual start of the frame. It was translated to between +/−FFTSIZE/4 samples. When needed, this offset error was passed on to the coherent reference block when it became known. To determine whether a delimiter is detected the following operations were performed:

$$Xcut[n] = \begin{cases} |\text{Norm\_resp}[n]|, & |\text{Norm\_resp}[n]| > K_{noise} \\ 0, & \text{otherwise} \end{cases} \quad \text{(Eq. 10)}$$

where, $K_{noise}=0.1$ was used to filter out the noise. The rectangular window Win[ ] was used to smooth the data by performing circular convolution with Xcut[n] as follows:

$$\eta[n]=X\text{cut}[n] \otimes \text{Win}[n] \quad\quad\quad (\text{Eq. 11})$$

To reduce the number of additions, the convolution was run only in the range: PeakIdx+WinLength/2 to PeakIdx-WinLength/2 in a circular fashion. Finally, the peak value of $\eta[\ ]$ called $C_{peak}$ was compared with a fixed threshold and if found larger, delimiter detection was confirmed. To improve the detector's performance, in some cases, this procedure was performed for two rectangular windows at the same time. A window with a large width helped in multi-path situations, while a smaller window tried to reject impulses.

Once the peak and its location were obtained, the delimiter's presence was confirmed if the peak value was above the required threshold. The peak location was then used to adjust the start of the next symbol. It should be noted that since pilots were only present in one out of four tones, only a maximum start of frame error of 4096/4 or 1024 samples (+/−5.12 µs) could be detected without ambiguity. In order to fully utilize this maximum limit, given the RI of 4.96 µs, a GI of 15.2 µs was used to process a clean un-overlapped signal. With the default GI of 6.96 µs, up to +/−1 µs error could be detected without any degradation.

Detecting on Channel 3

As described above, a receiver should be able to detect the delimiter of a transmitter that's using Channel 3 by only looking at Channel 1. If both channels were used by the receiver, the same procedure could be followed to detect the delimiter's presence on Channels 1 and 2 till the end of step 4 (FIG. 5A). In some cases, the two impulse responses were combined before the remaining steps were completed. Furthermore, in some cases, instead of two separate 4096 FFT operations, one 8192 FFT operation was performed at the start in step 1 (FIG. 5A).

Coherent Reference Generation and Frame Control Decoding

Depending on the system configuration, ¾th or ¼th of tones in the delimiter were used as FC tones. Before the Frame Control could be decoded, a coherent reference representing the effects of the channel on the respective amplitudes and phases of the carriers (e.g., the phase-dependent frequency response) was estimated. This was done using the received and transmitted pilot tones. Once the FC coherent reference was obtained, the FC was decoded. The FC was in turn re-encoded, and a new coherent reference for the payload was generated.

Channel 1 or Channel 2

Frame control was generally processed by using the tone mask's Encoding 1 alone. However, if Encoding 2 was also available, the receiver performance was further improved by using the additional diversity copying in Encoding 2 set of carriers. In addition to this, in some cases, the knowledge of the amplitude map was used to mask the received FC tones which had amplitudes of zero, thereby avoiding the particular tones in the receiver.

Figure 5B:
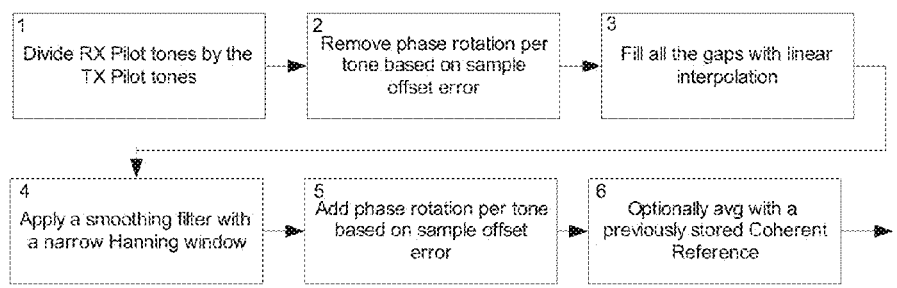

The first stage in FC processing, coherent reference generation, was performed in accordance with the sequence of operations described with respect to FIG. 5B. An initial channel reference based on the used tones was obtained by dividing the received pilot carriers (from the Rx FFT output) by those from Eq. 4. The phase rotation on each tone resulting from the offset error in samples from the start of the frame was then corrected as shown in Eq. 12:

$$PilotRefAdj(\text{Tones}) = \quad\quad\quad (\text{Eq. 12})$$
$$PilotRef(\text{Tones}) \times \exp\left(\frac{-j \times 2\pi \times OffsetError \times \text{Tone Indices}}{FFTLength}\right)$$

where, PilotRef is the output of step 1 and OffsetError is the error reported by the Delimiter detector given by Equation 9. When, due to the pipeline delays the output of the detector was unknown, this step was skipped. For large offset errors (e.g. >1 µs) there was some phase ambiguity in between the notches that sometimes led to an FC coherent reference that was not very accurate around the edges. However, because FC was encoded with QPSK, the impact was not damaging. In step 3, the channel response for tones in gaps between the pilot tones as well as notches was estimated. The tone mask used here was that given by Eq. 8. To begin with, the first and the last valid pilot tones were copy extended to DC and FFTLength/2, respectively. That is, all carriers that were before/after the first/last unmasked carrier, took their data value from the first/last unmasked carrier. Linear interpolation was followed between every two valid pilot tones to obtain channel estimates for the missing tones.

Suppose carriers A and B were known, and we wished to interpolate between these values to calculate C, which was L tones away from A, and H tones away from B. To be more accurate, the interpolation was done separately for phase and amplitude. The amplitude of C was found as follows:

$$|C| = \frac{H \times |A| + L \times |B|}{L + H} \quad\quad\quad (\text{Eq. 13})$$

The phase of C was found using the same principles and considering the phase relation between A and B when the phase crossed over from quadrant 1 to 4 or vice versa. The phases of A and B were assumed to be between 0 and 360 degrees and were calculated as:

If $(\angle A < 90)$ AND $(\angle B \geq 270) \rightarrow \angle B = \angle B - 360$ If $(\angle B < 90)$ AND $(\angle A \geq 270) \rightarrow \angle A = \angle A - 360 \quad\quad\quad (\text{Eq. 14})$ This was followed by Eq. 15 to calculate the phase of C.

$$\angle C = \frac{H \times \angle A + L \times \angle B}{L + H} \quad\quad\quad (\text{Eq. 15})$$

In some cases, this was done by separately interpolating the real and imaginary parts of the carriers. The same equation as Eq. 13 was used, except that instead of the absolute values, real or imaginary parts of carriers A and B were used to interpolate for the real and imaginary parts of carrier C, respectively.

Once a channel response estimate for all missing carriers was found, a narrow Hanning window (with a flat center) was applied to the time domain response via an FIR smoothing filter for noise reduction. Next, if step 2 was not skipped, the phase rotation due to the offset error was added again. The equation for step 5 in this case was substantially the same as Eq. 12 except that the negative sign was taken out. At the end of step 5, the FC coherent reference was ready to be used. For cases where a payload coherent reference for this particular channel was previously stored, the stored value was averaged with this new estimate to obtain a more accurate coherent reference. Before the references were averaged, the potential time offset between them in terms of the number of samples, was estimated. A phase correlator was used to determine this sample shift in two steps: First, by performing a coarse correlation in 1-sample steps, and second, performing a fine correlation in 0.01-sample steps within the range obtained from the coarse correlator. Once the offset was estimated, the previous coherent reference (PrevCohRef) was adjusted before being placed in the averaging filter as follows:

$$NewCohrRef = \\ \alpha \times PrevCohRef \times \exp(-i \times 2\pi \times (0:FFTLength/2-1) \times \\ SampleShift/FFTLength) + (1-\alpha) \times CurrCohRef \quad \text{(Eq. 16)}$$

where, α is 0.75.

Figure 5C:
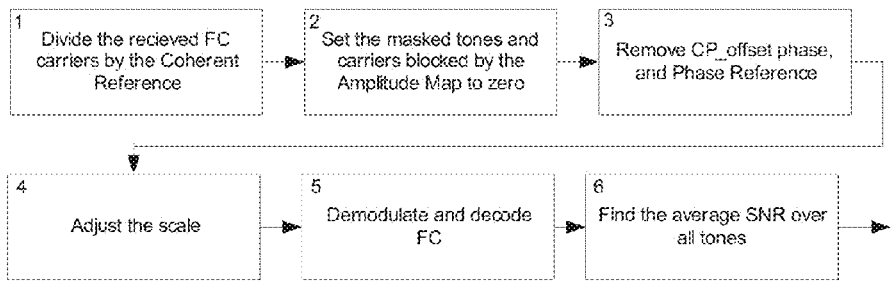

The Frame Control was decoded using a sequence of operations as shown in FIG. 5C. As described above, the tone mask Encoding 1 was sufficient for decoding the Frame Control using, for example, an algorithm described in HomePlug AV standard. However, where tone mask Encoding 2 was also available, more copies of the interleaved bits were combined in the decoding process as shown in Table 9. In this stage, only FC carriers were divided by the corresponding carriers in the coherent reference. The mask used here was combined combination of valid Encoding 1 and Encoding 2 tone masks. Also, as shown in step 2 in FIG. 5C, the amplitude map was also used to mask the tones that were turned off before the IFFT in the transmitter. Steps 3 and 4 are further described by Eq. 17. In this example, the SNR per tone was estimated from the constellation noise in the delimiter. The noise per carrier was in turn calculated as the square of the difference between soft and hard decisions. Furthermore, the average SNR over all tones was obtained to help determine the smoothing filter type used in the final stage. Alternatively, a SNR history saved from previous frames was used instead.

$$RxConst(FC\ Tones) = \frac{RxFFT(FC\ Tones) \times \exp\left(\frac{j \times 2\pi \times CP\_Offset \times FC\ Tone\ Indices}{FFTLength}\right) \times 10^{-0.8/20}}{CohRef(FC\ Tones) \times IFFTScale \times PhaseRef(FC\ Tones)} \quad \text{(Eq. 17)}$$

Figure 5D:
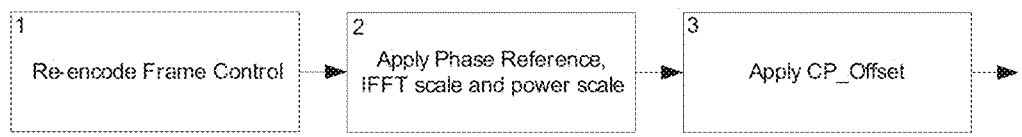

Once the Frame Control was decoded in stage 2, it was re-encoded in order to obtain the transmitted FC carriers. This is shown in FIG. 5D and is also described by Eq. 5. Next, a new Coherent Reference was calculated by using the combined transmitted pilot and FC carriers. This was more accurate as the gaps were fewer and more carriers were used in the estimation and was later used to decode the payload.

Figure 5E:
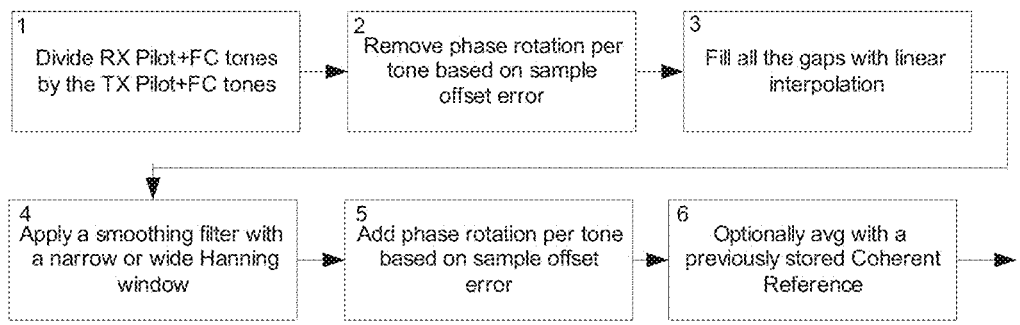

The final stage of payload coherent reference generation was performed using a sequence of steps shown in FIG. 5E. In this case, the same process as before was repeated, but this time, the combined pilot and FC carriers were used to interpolate the remaining gaps. Also depending on the average SNR (over all tones), either the narrow or the wide Hanning filter coefficients was used in the smoothing filter. The narrow window worked well at low SNRs, while the wide window provided better estimate at higher SNRs. The final outcome was used as the payload coherent reference. Note that in some cases, steps 2 and 5 of FIG. 5E were implemented to increase the quality of the coherent reference that was calculated. In some cases, the delimiter detection block provided the offset error used in Eq. 12.

Channel 3

While Channel 3 combined the frequency bands of Channel 1 and Channel 2, the number of information bits in the frame control still remained at 128 bits. Similar to the detection algorithm, receivers that looked only at Channel 1 were able to successfully decode the frame control in this case.

The procedure to generate a coherent reference and decode the frame control for Channel 3 was similar to that described above, except that the number of used tones were increased and that there was additional diversity copying in Channel 2. The decoding took place either simultaneously in Channels 1 and 2 as separate entities using their respective tone masks or as one channel using the combined tone mask. When it was done separately, a pause was needed in step 5 of stage 2 to properly combine diversity copies from both channels before proceeding to decode the FC. Once the coherent references from both channels were obtained, they were combined to form the overall coherent reference for Channel 3.

When decoding was done using the combined tone mask, the diversity combining was also performed. Diversity addressing in Encoding 1 portion was contiguous and followed the combined tone mask. Diversity addressing in Encoding 2 portion stopped at the end of lower band, and restarted with a different address at the start of the upper band as shown in Table 11. As explained earlier, this allowed receivers to decode the FC by just processing the lower band, while providing a high level of diversity when processing the entire Channel 3 band.

Decoding the Payload

The delimiter carried data payload when channel conditions were favorable. The carrier assignments were based on the configuration shown in Table 5. Only tones enabled by Encoding 1 Tone Mask were utilized to carry data in non-Robo packets. Payload was demodulated in a similar fashion as frame control as shown in the equation below.

$$RxConst(Data\ Tones) = \frac{RxFFT(Data\ Tones) \times \exp\left(\frac{j \times 2\pi \times CP\_Offset \times Data\ Tone\ Indices}{FFTLength}\right) \times 10^{-0.8/20}}{CohRef(Data\ Tones) \times IFFTScale \times PhaseRef(Data\ Tones)} \quad \text{(Eq. 17)}$$

Following calculating the received constellations, the log likelihood ratios (LLRs) per encoded data bits on carriers were obtained using the tone map and the received constellation points. Following this, the LLRs were put together with the LLRs from the subsequent symbols and were de-interleaved, Turbo decoded, and the final data bits were de-scrambled.

Phase Reference Table

The phase reference was a linear chirp waveform and the phase for each carrier was defined as the carrier's phase angle number multiplied by π/4. Phase angle numbers were integers from 0 to 7. With the first valid carrier FC=75 and last valid carrier LC=3277 (8192 length FFT), the table was calculated as follows:

$$PhaseAngle(K) = \text{Floor}\left(\frac{PhaseTemp(K-1)}{\pi/4}\right) \quad \text{(Eq. 19)}$$

where, K stands for carriers from FC to LC, PhaseAngle(LC)=7, and PhaseTemp was given by:

$$PhaseTemp(K) = \text{Mod}\left(PhaseTemp(K-1) - \frac{(K-FC+1)\times 2\pi}{NumCarrs}, 2\pi\right) \quad \text{(Eq. 20)}$$

where, PhaseTemp was initially zero, K was from FC-1 to LC-2, Mod referred to the modulo operation, and NumCarrs was given by:

$$NumCarrs = LC - FC + 1 \quad \text{(Eq. 21)}$$

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A method comprising:
   monitoring a shared medium at a second station, before receiving a waveform from a first station, to detect a start of a first symbol of the waveform at one of multiple time slot boundaries, the monitoring including, after each of multiple time slot boundaries, periodically sampling a series of values received over the shared medium starting at a beginning of a most recent time slot boundary and processing the sampled values to generate a metric value that indicates whether the start of the first symbol of the waveform has been detected;
   receiving the waveform from the first station over the shared medium at a time that is based on a shared time reference shared by the first station and the second station, the waveform including at least the first symbol, having a predetermined symbol length, comprising a first set of frequency components at predetermined carrier frequencies modulated with preamble information and a second set of frequency components at predetermined carrier frequencies modulated with frame control information, with the carrier frequencies of the first and second sets of frequency components being integral multiples of a frequency interval determined by an inverse of the symbol length; and
   in response to detecting the start of the first symbol of the waveform, demodulating, at the second station, the first symbol of the waveform from values sampled based on the shared time reference.

2. The method of claim 1 wherein the multiple time slot boundaries are boundaries of contention resolution slots used for resolving contention in carrier sense multiple access (CSMA).

3. The method of claim 2 wherein the shared medium is monitored after a detected collision.

4. The method of claim 1 wherein the multiple time slot boundaries are boundaries of slots within a time division multiple access (TDMA) allocation.

5. The method of claim 4, wherein the shared medium is monitored after missing an initial frame within the allocation.

6. The method of claim 1 further comprising calculating an offset from a time slot boundary determined relative to the shared time reference, wherein the offset is calculated based on a propagation delay between the first station and the second station.

7. The method of claim 6, wherein the offset is calculated at one of the first station and the second station.

8. The method of claim 1 wherein the shared time reference is determined based on a synchronization signal transmitted from a master station, wherein the synchronization signal can be detected without a determination of the shared time reference.

9. The method of claim 1, wherein the shared time reference is determined based on synchronizing a time base at the first station or the second station to a master time base maintained at a third station.

10. The method of claim 1, wherein a first portion of the waveform comprises the first symbol and a second portion of the waveform comprises a segment that is correlated with at least an initial segment of the first portion of the waveform.

11. The method of claim 10, wherein receiving the waveform includes receiving the second portion followed in time by the first portion over the shared medium.

12. The method of claim 11 further comprising receiving, at the second station, the first portion of the waveform, and storing data representative of the received first portion.

13. The method of claim 12, further comprising receiving, at the second station, the second portion of the waveform, and detecting a correlation between the stored data representative of the received first portion and data representative of an initial segment of the received second portion.

14. The method of claim 13, further comprising, in response to detecting the correlation, demodulating a symbol having a predetermined symbol length from the received second portion.

15. The method of claim 13, wherein the correlation is in a time domain.

16. The method of claim 15, wherein detecting the correlation is performed after passing the received waveform through a frequency selective filter.

17. The method of claim 13, wherein the correlation is in an frequency domain.

18. The method of claim 1, wherein the predetermined symbol length of the first symbol is greater than a time duration between adjacent slot boundaries.

19. The method of claim 1, wherein the first symbol is preceded by a prefix representing a cyclic extension of a terminal portion of the first symbol.

20. The method of claim 1, wherein the first symbol is followed by a suffix representing a cyclic extension of an initial portion of the first symbol.

21. A system for communicating between stations over a shared medium, the system comprising:
  a first station that transmits a waveform over the shared medium at a time that is based on a shared time reference shared by multiple of the stations, the waveform including at least a first symbol, having a predetermined symbol length, comprising a first set of frequency components at predetermined carrier frequencies modulated with preamble information stored in a second station and a second set of frequency components at predetermined carrier frequencies modulated with frame control information to be communicated to at least one station, with the carrier frequencies of the first and second sets of frequency components being integral multiples of a frequency interval determined by an inverse of the symbol length; and
  at least a second station that
    monitors the shared medium before transmission of the waveform from the first station, to detect a start of the first symbol of the waveform at one of multiple time slot boundaries, the monitoring including, after each of multiple time slot boundaries, periodically sampling a series of values received over the shared medium starting at a beginning of a most recent time slot boundary and processing the sampled values to generate a metric value that indicates whether the start of the first symbol of the waveform has been detected, and
    in response to detecting the start of the first symbol of the waveform, demodulates the first symbol of the waveform from values sampled based on the shared time reference.

22. A method comprising:
  transmitting a waveform from a first station over a shared medium to a second station at a time that is based on a shared time reference shared by the first station and the second station, the waveform including at least a first symbol, having a predetermined symbol length,
  wherein the first symbol comprises a first set of frequency components at predetermined carrier frequencies modulated with preamble information and a second set of frequency components at predetermined carrier frequencies modulated with frame control information, with the carrier frequencies of the first and second sets of frequency components being integral multiples of a frequency interval determined by an inverse of the symbol length.

23. The method of claim 22, further comprising forming a first portion of the waveform comprising the first symbol and a second portion of the waveform comprising a segment that is correlated with at least an initial segment of the first portion of the waveform.

24. The method of claim 23, wherein transmitting the waveform includes transmitting the second portion followed in time by the first portion over the shared medium.

25. The method of claim 22, further comprising adapting which frequency components are included in one or more of the first and second sets of frequency components to conditions on the shared medium.

26. The method of claim 22, further comprising adapting the symbol length to conditions on the shared medium.

27. The method of claim 22, wherein transmitting the waveform comprises transmitting the waveform at one of multiple time slot boundaries, wherein the multiple time slot boundaries are boundaries of contention resolution slots used for resolving contention in carrier sense multiple access (CSMA) or wherein the multiple time slot boundaries are boundaries of slots within a time division multiple access (TDMA) allocation.

28. The method of claim 22, further comprising calculating an offset from a time slot boundary determined relative to the shared time reference, wherein the offset is calculated based on a propagation delay between the first station and the second station.

29. The method of claim 22, wherein the shared time reference is determined based on a synchronization signal transmitted from a master station, wherein the synchronization signal can be detected without a determination of the shared time reference.

30. The method of claim 22, wherein the shared time reference is determined based on synchronizing a time base at the first station or the second station to a master time base maintained at a third station.

31. The method of claim 22, wherein a first portion of the waveform comprises the first symbol and a second portion of the waveform comprises a segment that is correlated with at least an initial segment of the first portion of the waveform.

32. The method of claim 31, wherein transmitting the waveform includes transmitting the second portion followed in time by the first portion over the shared medium.

33. The method of claim 32, wherein a correlation exists between the transmitted first portion and an initial segment of the second portion.

34. The method of claim 33, wherein the correlation is in a time domain or a frequency domain.

35. The method of claim 22, wherein the predetermined symbol length of the first symbol is greater than a time duration between adjacent slot boundaries.

36. The method of claim 22, wherein the first symbol is preceded by a prefix representing a cyclic extension of a terminal portion of the first symbol.

37. The method of claim 22, wherein the first symbol is followed by a suffix representing a cyclic extension of an initial portion of the first symbol.

38. An apparatus in a first station, the apparatus comprising:
  a transmitter suitable to transmit a waveform over a shared medium to a second station at a time that is based on a shared time reference shared by the first station and the second station, the waveform including at least a first symbol, having a predetermined symbol length,
  wherein the first symbol comprises a first set of frequency components at predetermined carrier frequencies modulated with preamble information and a second set of frequency components at predetermined carrier frequencies modulated with frame control information, with the carrier frequencies of the first and second sets of frequency components being integral multiples of a frequency interval determined by an inverse of the symbol length.

39. The apparatus of claim 38, wherein the transmitter comprises modules for implementing a physical (PHY) layer, the modules including at least an encoding module, a mapping module, and a modulation module configured to prepare the waveform including at least the first symbol.

40. An apparatus in a second station, the apparatus comprising:
  a receiver suitable to monitor a shared medium before receiving a waveform from a first station, to detect a start of a first symbol of the waveform at one of multiple time slot boundaries, the monitoring including, after each of multiple time slot boundaries, periodically sampling a series of values received over the shared medium starting at a beginning of a most recent time slot boundary and processing the sampled values to generate a metric value that indicates whether the start of the first symbol of the waveform has been detected;

the receiver suitable to receive the waveform from the first station over the shared medium at a time that is based on a shared time reference shared by the first station and the second station, the waveform including at least the first symbol, having a predetermined symbol length, comprising a first set of frequency components at predetermined carrier frequencies modulated with preamble information and a second set of frequency components at predetermined carrier frequencies modulated with frame control information, with the carrier frequencies of the first and second sets of frequency components being integral multiples of a frequency interval determined by an inverse of the symbol length; and the receiver suitable to demodulate the first symbol of the waveform from values sampled based on the shared time reference in response to detecting the start of the first symbol of the waveform.

41. A non-transitory computer readable medium storing computer program code, the computer program code comprising instructions which when executed by a processor of a device cause the device to perform operations comprising:

monitoring a shared medium at a second station, before receiving a waveform from a first station, to detect a start of a first symbol of the waveform at one of multiple time slot boundaries, the monitoring including, after each of multiple time slot boundaries, periodically sampling a series of values received over the shared medium starting at a beginning of a most recent time slot boundary and processing the sampled values to generate a metric value that indicates whether the start of the first symbol of the waveform has been detected;

receiving the waveform from the first station over the shared medium at a time that is based on a shared time reference shared by the first station and the second station, the waveform including at least the first symbol, having a predetermined symbol length, comprising a first set of frequency components at predetermined carrier frequencies modulated with preamble information and a second set of frequency components at predetermined carrier frequencies modulated with frame control information, with the carrier frequencies of the first and second sets of frequency components being integral multiples of a frequency interval determined by an inverse of the symbol length; and in response to detecting the start of the first symbol of the waveform, demodulating, at the second station, the first symbol of the waveform from values sampled based on the shared time reference.

42. A non-transitory computer readable medium storing computer program code, the computer program code comprising instructions which when executed by a processor of a device cause the device to perform operations comprising:

transmitting a waveform from a first station over a shared medium to a second station at a time that is based on a shared time reference shared by the first station and the second station, the waveform including at least a first symbol, having a predetermined symbol length, wherein the first symbol comprises a first set of frequency components at predetermined carrier frequencies modulated with preamble information and a second set of frequency components at predetermined carrier frequencies modulated with frame control information, with the carrier frequencies of the first and second sets of frequency components being integral multiples of a frequency interval determined by an inverse of the symbol length.

* * * * *